US011246681B2

(12) United States Patent
Cosse et al.

(10) Patent No.: US 11,246,681 B2
(45) Date of Patent: Feb. 15, 2022

(54) ADJUSTABLE-PRESCRIPTION ORTHODONTIC BRACKETS

(71) Applicant: Christopher C. Cosse, Shreveport, LA (US)

(72) Inventors: Christopher C. Cosse, Shreveport, LA (US); Calvin N. Corpus, Corona, CA (US)

(73) Assignee: Christopher C. Cosse, Shreveport, LA (US)

( * ) Notice: Subject to any disclaimer, the term of this patent is extended or adjusted under 35 U.S.C. 154(b) by 585 days.

(21) Appl. No.: 16/016,294

(22) Filed: Jun. 22, 2018

(65) Prior Publication Data

US 2018/0368947 A1 Dec. 27, 2018

Related U.S. Application Data

(60) Provisional application No. 62/523,544, filed on Jun. 22, 2017.

(51) Int. Cl.
*A61C 7/28* (2006.01)
*A61C 7/14* (2006.01)
*A61C 7/30* (2006.01)

(52) U.S. Cl.
CPC ............... *A61C 7/285* (2013.01); *A61C 7/14* (2013.01); *A61C 7/28* (2013.01); *A61C 7/30* (2013.01); *A61C 7/287* (2013.01)

(58) Field of Classification Search
CPC .... A61C 7/12; A61C 7/14; A61C 7/20; A61C 7/22; A61C 7/28; A61C 7/30; A61C 7/34; A61C 7/141; A61C 7/287; A61C 7/285
See application file for complete search history.

(56) References Cited

U.S. PATENT DOCUMENTS

| 1,280,628 | A | | 10/1918 | Angle |
| 1,821,171 | A | | 9/1931 | Atkinson |
| 3,423,833 | A | * | 1/1969 | Pearlman ............. A61C 7/12 433/16 |
| 3,435,527 | A | | 4/1969 | Kesling |

(Continued)

FOREIGN PATENT DOCUMENTS

WO    WO 2010/105301 A1    9/2010

*Primary Examiner* — Edward Moran
*Assistant Examiner* — Matthew P Saunders
(74) *Attorney, Agent, or Firm* — Dascenzo Gates Intellectual Property Law, P.C.

(57) ABSTRACT

Adjustable-prescription orthodontic brackets that include a bracket body, a repositionable core that defines an archwire slot, and a core positioning assembly. The bracket body defines a core receptacle into which the core is received and selectively moved within a plurality of prescriptive orientations. The core positioning assembly is selectively transitioned between a disengaged configuration, in which the core positioning assembly permits movement of the core relative to the bracket body within the plurality of prescriptive orientations, and an engaged configuration, in which the core positioning assembly retains the core at the selected prescriptive orientation. The core positioning assembly includes a core clamp with a core engagement surface configured to be selectively engaged with the core, and an actuator configured to selectively secure the core clamp in engagement with the core to retain the core at the selected prescriptive orientation.

22 Claims, 15 Drawing Sheets

(56) References Cited

U.S. PATENT DOCUMENTS

| | | | |
|---|---|---|---|
| 3,721,005 A * | 3/1973 | Cohen | A61C 7/14 433/16 |
| 3,748,740 A | 7/1973 | Wildman | |
| 3,772,787 A | 11/1973 | Hanson | |
| 4,077,126 A | 3/1978 | Pletcher | |
| 4,139,945 A | 2/1979 | DiGiulio | |
| 4,144,642 A | 3/1979 | Wallshein | |
| 4,171,568 A | 10/1979 | Förster | |
| 4,197,642 A | 4/1980 | Wallshein | |
| 4,243,387 A * | 1/1981 | Prins | A61C 7/12 433/16 |
| 4,248,588 A | 2/1981 | Hanson | |
| 4,353,692 A | 10/1982 | Karrakussoglu | |
| 4,371,337 A | 2/1983 | Pletcher | |
| 4,419,078 A | 12/1983 | Pletcher | |
| 4,443,189 A | 4/1984 | Wildman | |
| 4,492,573 A | 1/1985 | Hanson | |
| 4,496,318 A | 1/1985 | Connelly, Jr. | |
| 4,531,911 A | 7/1985 | Creekmore | |
| 4,559,012 A | 12/1985 | Pletcher | |
| 4,561,844 A | 12/1985 | Bates | |
| 4,597,739 A | 7/1986 | Rosenberg | |
| 4,614,497 A | 9/1986 | Kurz | |
| 4,655,708 A | 4/1987 | Fujita | |
| 4,698,017 A | 10/1987 | Hanson | |
| 4,712,999 A | 12/1987 | Rosenberg | |
| 4,867,678 A | 9/1989 | Parker | |
| 4,878,840 A | 11/1989 | Reynolds | |
| 5,094,614 A | 3/1992 | Wildman | |
| 5,224,858 A | 7/1993 | Hanson | |
| 5,302,121 A | 4/1994 | Gagin | |
| 5,320,526 A | 6/1994 | Tuneberg | |
| 5,322,435 A | 6/1994 | Pletcher | |
| 5,466,151 A | 11/1995 | Damon | |
| 5,562,444 A | 10/1996 | Heiser et al. | |
| 5,586,882 A | 12/1996 | Hanson | |
| 5,630,715 A | 5/1997 | Voudouris | |
| 5,711,666 A | 1/1998 | Hanson | |
| 5,857,850 A | 1/1999 | Voudouris | |
| 5,954,502 A | 9/1999 | Tuenge et al. | |
| 6,193,508 B1 | 2/2001 | Georgakis | |
| 6,302,688 B1 | 10/2001 | Jordan et al. | |
| 6,358,045 B1 | 3/2002 | Farzin-Nia et al. | |
| 6,582,226 B2 | 6/2003 | Jordan et al. | |
| 6,632,088 B2 | 10/2003 | Voudouris | |
| 6,655,957 B2 | 12/2003 | Abels et al. | |
| 6,659,766 B2 | 12/2003 | Abels et al. | |
| 7,025,591 B1 | 4/2006 | Kesling | |
| 7,306,458 B1 | 12/2007 | Lu | |
| 7,431,586 B1 | 10/2008 | Silverman | |
| 7,771,640 B2 | 8/2010 | Cosse | |
| 7,819,660 B2 | 10/2010 | Cosse | |
| 7,963,768 B2 | 6/2011 | Hilliard | |
| 8,272,867 B2 | 9/2012 | Chikami et al. | |
| 8,333,586 B2 | 12/2012 | Kantomaa | |
| 8,337,198 B2 | 12/2012 | Cosse | |
| 8,366,440 B2 | 2/2013 | Bathen et al. | |
| 9,198,740 B2 | 12/2015 | Damon et al. | |
| 9,655,694 B2 | 5/2017 | Cosse et al. | |
| 9,795,456 B2 | 10/2017 | Bindayel | |
| 9,888,984 B2 | 2/2018 | Rudman | |
| 9,949,806 B2 * | 4/2018 | Cosse | A61C 7/285 |
| 9,999,481 B2 * | 6/2018 | Cosse | A61C 7/14 |
| 10,653,504 B2 | 5/2020 | Cosse | |
| 2006/0172247 A1 | 8/2006 | Abels et al. | |
| 2007/0092849 A1 * | 4/2007 | Cosse | A61C 7/14 433/8 |
| 2008/0293005 A1 | 11/2008 | Rahlis et al. | |
| 2009/0130621 A1 | 5/2009 | Chikami | |
| 2011/0183280 A1 | 7/2011 | Cosse et al. | |
| 2012/0308952 A1 | 12/2012 | Cosse | |
| 2012/0315593 A1 * | 12/2012 | Ramos-de-la-Pena | A61C 7/14 433/9 |
| 2013/0078595 A1 | 3/2013 | Solano Reina et al. | |
| 2014/0045137 A1 * | 2/2014 | Solano Reina | A61C 7/285 433/9 |
| 2014/0205962 A1 * | 7/2014 | Damon | A61C 7/14 433/13 |
| 2014/0272751 A1 * | 9/2014 | Cosse | A61C 7/02 433/9 |
| 2014/0370454 A1 | 12/2014 | Rudman | |
| 2015/0017597 A1 * | 1/2015 | Solano Reina | A61C 7/141 433/10 |
| 2015/0050612 A1 | 2/2015 | Damon et al. | |
| 2015/0182306 A1 * | 7/2015 | Chen | A61C 7/143 433/9 |
| 2015/0305833 A1 * | 10/2015 | Cosse | A61C 7/002 433/3 |
| 2016/0128804 A1 * | 5/2016 | Ji | A61C 7/141 433/16 |
| 2016/0175072 A1 | 6/2016 | Andreiko et al. | |
| 2016/0175073 A1 | 6/2016 | Huang | |
| 2017/0128165 A1 | 5/2017 | Bindayel | |
| 2017/0128167 A1 * | 5/2017 | Bindayel | A61C 7/28 |
| 2017/0128168 A1 | 5/2017 | Bindayel | |

* cited by examiner

ADJUSTABLE-PRESCRIPTION ORTHODONTIC BRACKETS

RELATED APPLICATION

This application claims priority under 35 U.S.C. § 119(e) to U.S. Provisional Patent Application No. 62/523,544, which was filed on Jun. 22, 2017, is entitled "Adjustable-Prescription Orthodontic Bracket Assemblies," and the disclosure of which is incorporated by reference herein. This application also incorporates by reference U.S. Pat. Nos. 9,655,694 and 9,999,481.

FIELD OF THE DISCLOSURE

The present disclosure is directed generally to the orthodontic field, and more particularly to adjustable-prescription orthodontic brackets.

BACKGROUND OF THE DISCLOSURE

Orthodontic brackets typically are small, slotted devices for use during orthodontic treatment. The brackets usually are configured for attachment to front surfaces of teeth. Slots in the brackets, which may be referred to herein as archwire slots and/or as archwire passages are configured to receive an archwire. Traditionally, an archwire is a resilient, curved piece of wire that may be bent and/or twisted prior to installation in the bracket slots, with an archwire typically extending through the slots of all of the orthodontic brackets that are attached to a patient's upper or lower teeth. Engagement between the archwire and the brackets creates corrective, or prescriptive, forces that are directed to the teeth by the orthodontic brackets to urge the teeth into a correct, or desired, alignment, or occlusion.

The archwire may be secured in the archwire slot of an orthodontic bracket by a variety of mechanisms, such as depending on the bracket configuration. For example, a "ligating" bracket typically requires a separate fastener, such as a ligature wire or elastic band, which is tied or otherwise positioned around ligating structures, such as tie wings, on the bracket body to secure the archwire in place within the archwire slot of a bracket. A "self-ligating" bracket, on the other hand, typically includes a gate or other self-locking mechanism, such as a closeable bracket slot, that allows such a bracket to retain the archwire in the archwire slot without requiring the use of ligatures or other separate fasteners. Ligatures and/or supplemental fasteners or biasing structures also may be used with self-ligating brackets, but they are not required to retain the archwire in the archwire slot.

Regardless of whether the bracket is a self-ligating bracket or whether the bracket requires separate fasteners or ligatures to secure an archwire in the bracket's archwire slot, orthodontic treatment of a patient's teeth typically requires periodic adjustment of the forces that are imparted to the patient's teeth by the installed orthodontic brackets, archwire(s), etc. Adjustments include changing the magnitude and/or direction of the forces that are imparted to the patient's teeth, such as to adjust the degree to which torque, tip, and/or rotational forces are imparted to the patient's teeth to change the angulation, inclination, rotation, height and/or location of the teeth in order to move the teeth toward an optimal occlusion.

As used herein, tipping forces refer to forces applied to the tooth in the mesial-distal direction. Thus, tipping forces may impact angulation. Torsional forces refer to forces applied to the tooth by an archwire that is in torsion within the archwire passage. Thus, torsional forces tend to rotate the tooth in the buccal-lingual or labial-lingual direction and may impact inclination. Rotational forces refer to applied forces that tend to rotate the tooth about its long axis.

Adjustments of some of these forces, including torsional (i.e., torque) forces, typically requires removal of the archwire from the corresponding brackets, along with replacement of the archwire and, in some cases, removal and replacement of one or more brackets. Even with a bracket that permits the applied forces to be adjusted without removal of the bracket from a patient's tooth, fine adjustment of these forces still may be challenging. Thus, there exists a need for improved adjustable-prescription orthodontic brackets.

SUMMARY OF THE DISCLOSURE

Adjustable-prescription orthodontic brackets that include a bracket body, a repositionable core that defines an archwire slot, and a core positioning assembly are disclosed herein. The bracket body defines a core receptacle into which the core is received and selectively moved within a plurality of prescriptive orientations. The core positioning assembly is selectively transitioned between a disengaged configuration, in which the core positioning assembly permits movement of the core relative to the bracket body within the plurality of prescriptive orientations, and an engaged configuration, in which the core positioning assembly retains the core at the selected prescriptive orientation. The core positioning assembly includes a core clamp with a core engagement surface configured to be selectively engaged with the core, and an actuator configured to selectively secure the core clamp in engagement with the core to retain the core at the selected prescriptive orientation.

Figure 1:
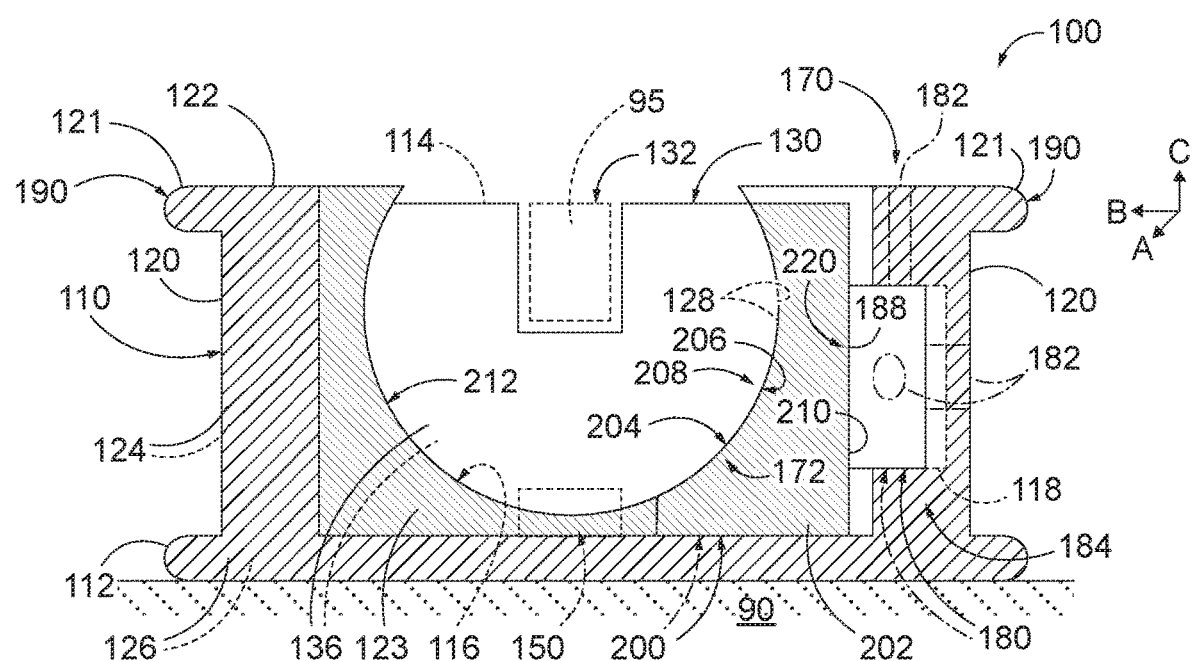
FIG. 1 is a schematic partial cross-sectional side view of examples of an orthodontic bracket according to the present disclosure in an engaged configuration.

DETAILED DESCRIPTION AND BEST MODE
OF THE DISCLOSURE

FIGS. 1-36 provide examples of orthodontic brackets 100 according to the present disclosure, components of orthodontic brackets 100, and/or features of orthodontic brackets 100. Elements that serve a similar, or at least substantially similar, purpose are labeled with like numbers in each of FIGS. 1-36, and these elements may not be discussed in detail herein with reference to each of FIGS. 1-36. Similarly, all elements may not be labeled in each of FIGS. 1-36, but reference numerals associated therewith may be utilized herein for consistency. Elements, components, and/or features that are discussed herein with reference to one or more of FIGS. 1-36 may be included in and/or utilized with any of FIGS. 1-36 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIGS. 1-5 include schematic views of examples of an orthodontic bracket 100 according to the present disclosure. Orthodontic bracket 100 also may be referred to herein as an adjustable-prescription orthodontic bracket 100, as an adjustable-prescription bracket 100, as a repositionable orthodontic bracket 100, and/or more simply as a bracket 100. Bracket 100 includes a bracket body 110 that defines a core receptacle 116 that is sized and configured to receive a core 130.

Core 130 defines an archwire slot, or archwire passage, 132 that is sized and configured to receive an archwire 95 during orthodontic use of bracket 100. Core 130 additionally or alternatively may be referred to herein as an arcuate core 130, a repositionable core 130, an adjustable core 130, and/or a rotatable core 130. Core 130 is retained within the core receptacle, at least during orthodontic use of the bracket, typically by mechanical linkages or barriers. For example, core 130 may be mechanically coupled to an internal component of the bracket, such as a rotation-directing structure, rib, track, pin, axle, and the like, optionally by core 130 being formed from two or more core sections 136 that are secured together around such a track, pin, rib, axle, etc. As another example, bracket body 110 may be assembled around core 130 and may not define a passage or other opening that is large enough for the core to pass therethrough to be removed from the bracket body after assembly of the bracket body.

Core 130 is configured to be selectively moved, or repositioned, within core receptacle 116 and relative to the bracket body within a plurality of prescriptive orientations. For example, core 130 may be configured to be selectively rotated or otherwise moved about one or more rotational axes. As examples, the rotational axes may include and/or be the A-axis, the B-axis, and/or the C-axis of FIG. 1. As the orientation of the core is moved relative to the bracket body, the orientation of the corresponding archwire slot 132 of the core also moves relative to the bracket body, and thus relative to the tooth 90 to which the bracket is attached during orthodontic use of the bracket. By repositioning, reorienting, or otherwise moving the core from a previously selected prescriptive orientation to a newly selected prescriptive orientation, the forces that are imparted to the patient's teeth during orthodontic use of the bracket may be altered. This enables an orthodontist or other dental practitioner to selectively adjust the prescriptive forces to be imparted to a patient's tooth by an installed bracket 100 simply by adjusting the prescriptive orientation of the core relative to the bracket base.

Bracket 100 further includes a core positioning assembly 170 that is selectively transitioned between a disengaged configuration, in which the core positioning assembly permits movement of the core relative to the bracket body within the plurality of prescriptive orientations, and an engaged configuration, in which the core positioning assembly retains the core at a selected prescriptive orientation of the plurality of prescriptive orientations. The core positioning assembly includes a core clamp 200 with a core engagement surface 204 configured to be selectively engaged with the core, at least when the core positioning assembly is in the engaged configuration. The core positioning assembly further includes actuator 180 that is configured to selectively secure the core clamp in engagement with the core to retain the core at the selected prescriptive orientation. The engaged and disengaged configurations of the core positioning assembly additionally or alternatively respectively may be referred to as secured and unsecured configurations and/or as locked and unlocked configurations of the core positioning assembly.

Figure 3:
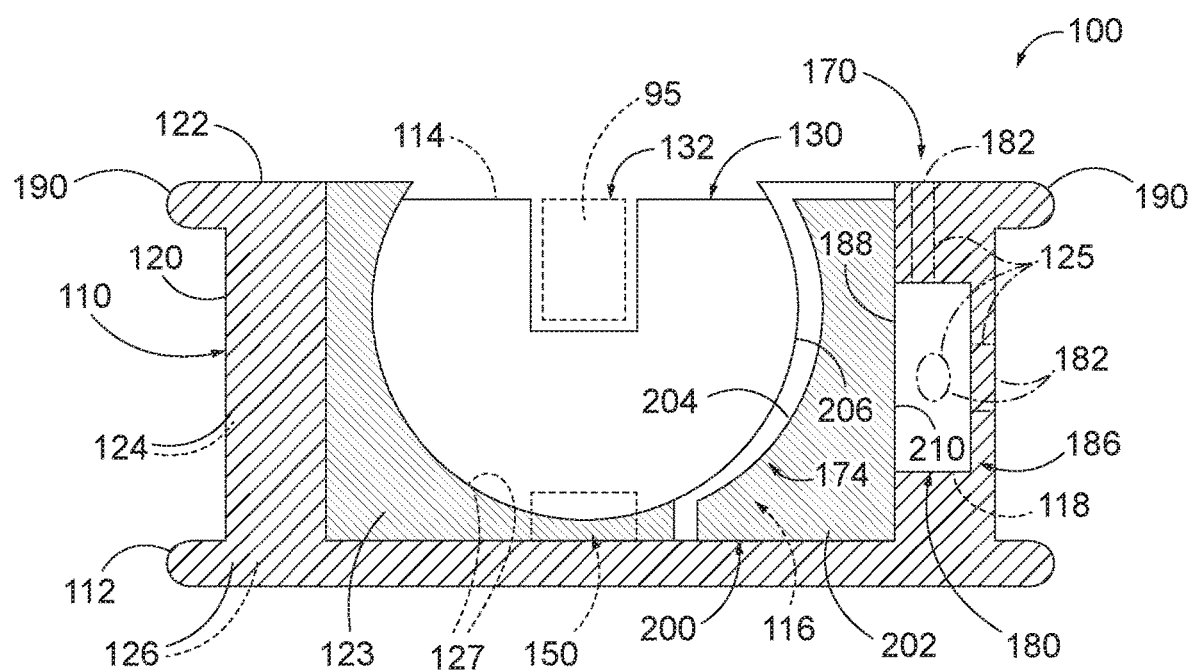
FIG. 3 is a schematic partial cross-sectional side view of the orthodontic bracket of FIG. 1 in an example of a disengaged configuration.

Bracket body 110 may include any suitable structure that defines at least a portion, if not all, of the core receptacle 116, may receive core 130 within core receptacle 116, and/or may be operatively affixed to tooth 90. Bracket body 110 includes a base 112, which also may be referred to as a bracket base 112. As illustrated schematically in FIG. 1, bracket 100 may be operatively affixed to a patient's tooth 90, such as via base 112 of bracket body 110. Base 112 may be operatively affixed or otherwise coupled to tooth 90, such as by being adhered directly to the tooth or by being secured to a band that extends around the tooth. Base 112 may be integrally formed with and/or operatively affixed to other portions of bracket body 110, such as one or more sidewalls 120. In some embodiments, and as schematically illustrated in FIGS. 1 and 3, base 112 may project beyond the perimeter of the remainder of the bracket body. In some embodiments, the bracket base may be the portion of the bracket body that is closest to the tooth to which the bracket is secured during orthodontic use of the bracket.

Bracket body 110 also includes sidewalls 120 that extend away from bracket base 112, and a bracket top, or top surface, 122 that is distal the tooth relative to the bracket base. In other words, bracket top 122 refers to the portion of the bracket that is distal the bracket base 112, and during operative use of the bracket, distal the patient's tooth 90 to which the bracket is mounted. Top 122 additionally or alternatively may be described as being opposed to base 112, being distal base 112, and/or facing away from the patient's tooth 90 to which the bracket body is coupled during orthodontic use of the bracket. In some embodiments, bracket top 122 is formed, at least in part, by the portions of sidewalls 120 that are distal base 112. In some embodiments, the bracket includes an upper surface that extends generally transverse to sidewalls 120 and defines top 122. As used herein, "distal" and "proximal" refer to the relative position of components, with a proximal component being closer to a reference point than a distal component. Thus, a bracket base that is proximal to a tooth is closer to the tooth than the top of the bracket body that is distal the tooth.

FIG. 1 also illustrates that bracket body 110 may include at least one clearance region 114, such as in opposed sidewalls 120 and that bracket body 110 may include projections 121 that extend generally away from top 122. Clearance region(s) 114, when present, may be shaped to permit the archwire to pass therethrough during orthodontic use of bracket 100. Projections 121 additionally or alternatively may be referred to as tie wings 121 and/or may be examples of ligating structure 190, as discussed in more detail herein. Projections 121 provide anchors or supports for ligatures and other ties, springs, elastics, and the like that are attached to the bracket during orthodontic use of the bracket. Projections 121, when present, typically extend generally parallel to base 112 and/or at an angle toward base 112, although neither orientation is required to all embodiments.

As also schematically illustrated in FIG. 1, bracket body 110 also may include one or more spacers 123 that project from and/or are positioned internal of sidewalls 120 and/or one or more passages 125 that extend therethrough, such as through sidewalls 120 and/or top 122. Spacers 123, when present, may define at least a portion of core receptacle 116, and may support and/or assist in defining the plurality of prescriptive orientations of core 130. Spacers 123 additionally or alternatively may be referred to as supports 123, boundaries 123, and/or guides 123. Passages 125, when present, may enable portions of core positioning assembly 170 to extend at least partially or completely therethrough and/or may enable access to portions of the core positioning assembly, such as a receiver of the actuator of the core positioning assembly. This access may, for example, be used to selectively configure the actuator between a locked position and an unlocked position, as discussed in more detail herein.

Bracket body 110 may be formed and/or defined in any suitable manner and/or may have any suitable configuration. As an example, bracket body 110 may include and/or be a monolithic structure that includes, forms, and/or defines at least a portion of core receptacle 116, base 112 and/or top 122. Such a monolithic structure may be formed, for example, by molding or by an additive manufacturing process. As another example, bracket body 110 may include a plurality of bracket sections, or bracket portions, 124 that may be operatively attached and/or affixed to one another and/or that collectively may include, form, and/or define core receptacle 116, base 112, and/or top 122. As a more specific example, bracket body 110 may include at least a first bracket section 124 and a second bracket section 124. The bracket sections 124, such as the first bracket section and the second bracket section, may be operatively affixed to one another and together may define base 112 and at least a substantial portion of core receptacle 116. As another example, bracket sections 124 may be operatively affixed to a base section 126 that defines the base. Bracket sections 124 and/or base section 126 may be operatively affixed to one another in any suitable manner. As examples, bracket sections 124 and/or base section(s) 126 may be adhered, melted, alloyed, welded, and/or brazed to one another.

Core receptacle 116 may define any suitable shape for receiving core 130 therein. For example, core receptacle 116 may extend from base 112 toward top 122 and/or away from tooth 90. In such a configuration, core receptacle 116 may be described as opening, or having an opening that faces, generally away from base 112. Core receptacle 116 may be defined by any suitable surface(s) of bracket body 110 and/or core positioning assembly 170. Core receptacle 116 additionally or alternatively may be referred to as an internal chamber 116, core-receiving cavity 116, a body core receptacle 116, a bracket core receptacle 116, and/or a body compartment 116. Examples of the shape of core receptacle 116 include cylindrical, partial cylindrical, spherical, and/or partial spherical shapes. As examples, the shape of core receptacle 116 may complement a shape of core 130, the shape of core receptacle 116 may correspond to the shape of core 130, and/or the shape of core receptacle 116 may be at least substantially similar to at least a portion of the shape of core 130, such as a portion of core 130 that contacts bracket body 110. This similar shape between core receptacle 116 and core 130 may permit core 130 to be received and selectively positioned within and/or to rotate within the core receptacle. For example, the corresponding identically/similarly shaped surfaces of the core receptacle and the core may form glide, or guide, surfaces 127 that may support the core within the core receptacle and/or at least partially define the plurality of prescriptive orientations within which the core is selectively moved. Core receptacle 116 need not complement the shape of core 130 in all embodiments.

As schematically illustrated in FIGS. 1-4, core 130 and/or corresponding portions of core receptacle 116 may include arcuate guide surfaces 127 that have the same or very similar shapes and sizes that enable surfaces of engagement between the corresponding surfaces. Additionally or alternatively, core receptacle 116 and core 130 need not both be arcuate. As an example, core receptacle 116 may include and/or define the arcuate shape, while core 130 may include and/or define any other suitable shape that may be received within and rotate within the core receptacle. As another example, core 130 may include and/or define the arcuate shape, while core receptacle 116 may include and/or define any other suitable shape that may receive and facilitate rotation of the core.

As discussed in more detail herein, at least a portion of core positioning assembly 170, such as core clamp 200, also may be at least partially received within core receptacle 116. As also discussed, bracket body 110 may define or otherwise include an actuator receptacle 118 into which a portion of core positioning assembly 170, such as actuator 180 and/or a portion of the core clamp 200, at least partially extend at least when the core positioning assembly is in the disengaged configuration.

Core 130 may include any suitable structure that defines archwire slot 132, that is sized and/or shaped to be received, retained, and selectively repositioned within core receptacle 116 of bracket body 110. For example, core 130 may be selectively rotated or otherwise repositioned relative to the bracket body while the core is received within core receptacle 116 and without requiring removal of the core from the core receptacle.

Figure 6:
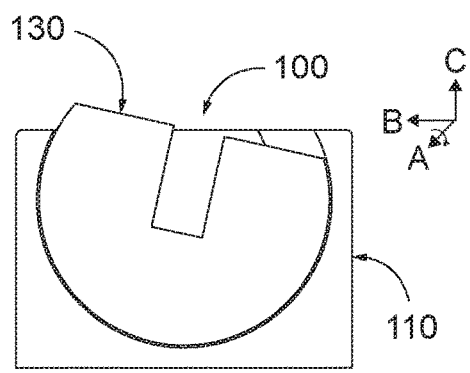
FIG. 6 is a schematic representation of the orthodontic bracket of FIGS. 1-5 with the core rotated clockwise about the A-axis.
Figure 7:
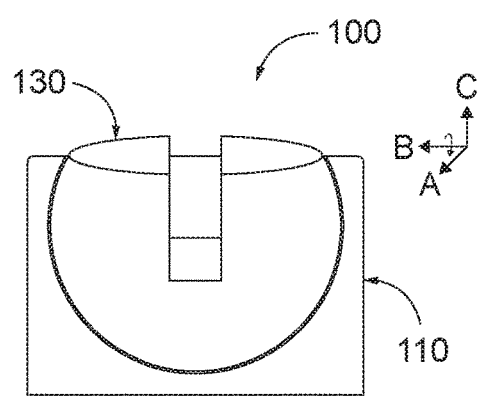
FIG. 7 is a schematic representation of the orthodontic bracket of FIGS. 1-5 with the core rotated clockwise about the B-axis.
Figure 8:
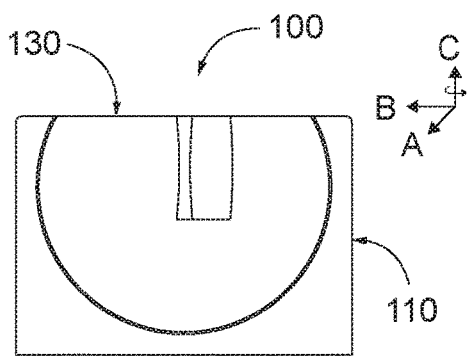
FIG. 8 is a schematic representation of the orthodontic bracket of FIGS. 1-5 with the core rotated counterclockwise about the C-axis.

As an example, core 130 may be configured to rotate about a first rotational axis, such as the A-axis of FIG. 1. This is illustrated in FIG. 6, where core 130 has been rotated in a clockwise direction about the A-axis (relative to the configuration that is illustrated in FIG. 1). Additionally or alternatively, core 130 also may be configured to rotate about a second rotational axis, such as the B-axis of FIG. 1. This is illustrated in FIG. 7, where core 130 has been rotated in a clockwise direction about the B-axis (relative to the configuration that is illustrated in FIG. 1). Additionally or alternatively, core 130 may be configured to rotate about a third rotational axis, such as the C-axis of FIG. 1. This is illustrated in FIG. 8, wherein core 130 has been rotated in a counterclockwise direction about the C-axis (relative to the configuration that is illustrated in FIG. 1).

Rotational axes A, B, and/or C may define any suitable direction when bracket 100 is operatively affixed to tooth 90. As an example, rotational axis A may extend (at least substantially) in a mesial-distal direction. Under these conditions, rotation of core 130 about rotational axis A may be utilized to change, adjust, and/or vary torque forces that may be applied to tooth 90 by archwire 95. As another example, rotational axis B may extend (at least substantially) in a gingival-occlusal direction. Under these conditions, rotation of core 130 about rotational axis B may be utilized to change, adjust, and/or vary rotational forces that may be applied to tooth 90 by archwire 95. As yet another example, rotational axis C may extend (at least substantially) in a buccal-lingual and/or in a labial-lingual direction. Under these conditions, rotation of core 130 about rotational axis C may be utilized to change, adjust, and/or vary tipping forces that may be applied to tooth 90 by archwire 95. However, rotational axes A, B, and/or C are not required to be orthogonal to one another and/or are not required to align, or align exactly, with the above-described directions. In addition, bracket 100 may be configured to permit core 130 to be rotated about two, or even three, different rotational axes and/or may permit (substantially) unconstrained rotation of core 130 within core receptacle 116 over at least a threshold range of rotation when core positioning assembly 170 is in disengaged configuration 174. The rotational axes additionally or alternatively may be referred to as adjustment axes, pivot axes, and/or movement axes.

As further examples, core 130 may define a cylindrical shape, an at least substantially cylindrical shape, and/or a partially cylindrical shape. When core 130 defines the cylindrical shape, the rotational axis may correspond to, be parallel to, or be, a longitudinal axis of the cylindrical shape. Additionally or alternatively, core 130 may be configured to rotate only about a single rotational axis, and this single rotational axis may correspond to, be parallel to, or be the longitudinal axis of the cylindrical shape. As further examples, core 130 may define a spherical shape, an at least substantially spherical shape, a spheroid shape, a hemispherical shape, an ovoid shape, an elliptical shape, and/or a partially spherical shape. When core 130 has one of these illustrative shapes, core 130 may be configured to rotate about a single rotational axis or a plurality of distinct rotational axes while received within core receptacle 116. As another example, core 130 may be configured for unconstrained, or at least substantially unconstrained, rotation within core receptacle 116 when the core positioning assembly is in the disengaged configuration.

Core 130 may be permanently (but adjustably) secured within core receptacle 116 of bracket body 110. By "permanently secured," it is meant that the core and/or bracket body are not configured for removal of the core from the bracket body without damage or destruction of at least a portion of the bracket. For example, and as discussed, the bracket body may not define a passage with a sufficient size to permit the core to pass therethrough, the core may be assembled or otherwise formed around components of the bracket, and/or the bracket body may be assembled around the core in a manner that does not permit subsequent disassembly after the bracket is assembled. It also is within the scope of the present disclosure that core 130 and/or bracket body 110 may be configured to permit selective removal of the core from the bracket body and/or replacement of the core within the bracket body without damage or destruction of the core or bracket body. For example, a core 130 with a particular construction, archwire slot geometry, and/or archwire slot orientation may be received and replaced with a different core (i.e., a core with a different construction, archwire slot geometry, and/or archwire slot orientation) to vary the prescriptive forces that the bracket may impart to a tooth during orthodontic use of bracket 100.

This may include disassembly of at least a portion of orthodontic bracket 100 to permit removal of the core from the core receptacle. This disassembly may be accomplished in any suitable manner. As an example, this disassembly may include separation of one or more bracket sections 124 from the bracket body. As another example, this disassembly may include separation of base 112 from the bracket body. As yet another example, this disassembly may include separation of core 130 into one or more core sections 136. As another example, this disassembly may include removal and/or actuation of a stop, catch, latch, and/or pin that may be associated with orthodontic bracket 100.

As used herein, the phrase "orthodontic use" refers to use of a bracket 100 that is secured to a patient's tooth and which contains an archwire 95 operatively secured within the bracket's archwire slot 132 to apply forces to at least the patient's tooth 90 to which the bracket is secured to alter the relative orientation of the patient's tooth in the patient's mouth. A plurality of orthodontic brackets typically are mounted to a corresponding plurality of a patient's upper or lower teeth, with an archwire extending through the archwire slots of the corresponding plurality of orthodontic brackets on the patient's upper or lower teeth during orthodontic use of the brackets. It follows then that the prescriptive forces imparted to a particular tooth of the patient's teeth may be primarily imparted by the orthodontic bracket that is mounted to that tooth, but additional forces may be imparted by orthodontic brackets on adjacent teeth, via the archwire that interconnects the adjacent orthodontic brackets.

Core positioning assembly 170 may form a portion of bracket body 110 and/or may define at least a portion of core receptacle 116. As discussed, core positioning assembly 170 is configured to selectively retain core 130 at a selected prescriptive orientation within bracket body 110 and to permit selective repositioning of the core within the plurality of prescriptive orientations. Core positioning assembly 170 additionally or alternatively may be referred to as a core lock assembly 170 and/or as a prescription-defining assembly 170. As an example, and as discussed in more detail herein, core positioning assembly 170 may be configured to be selectively transitioned or otherwise moved or reconfigured between an engaged configuration 172 and a disengaged configuration 174.

Figure 2:
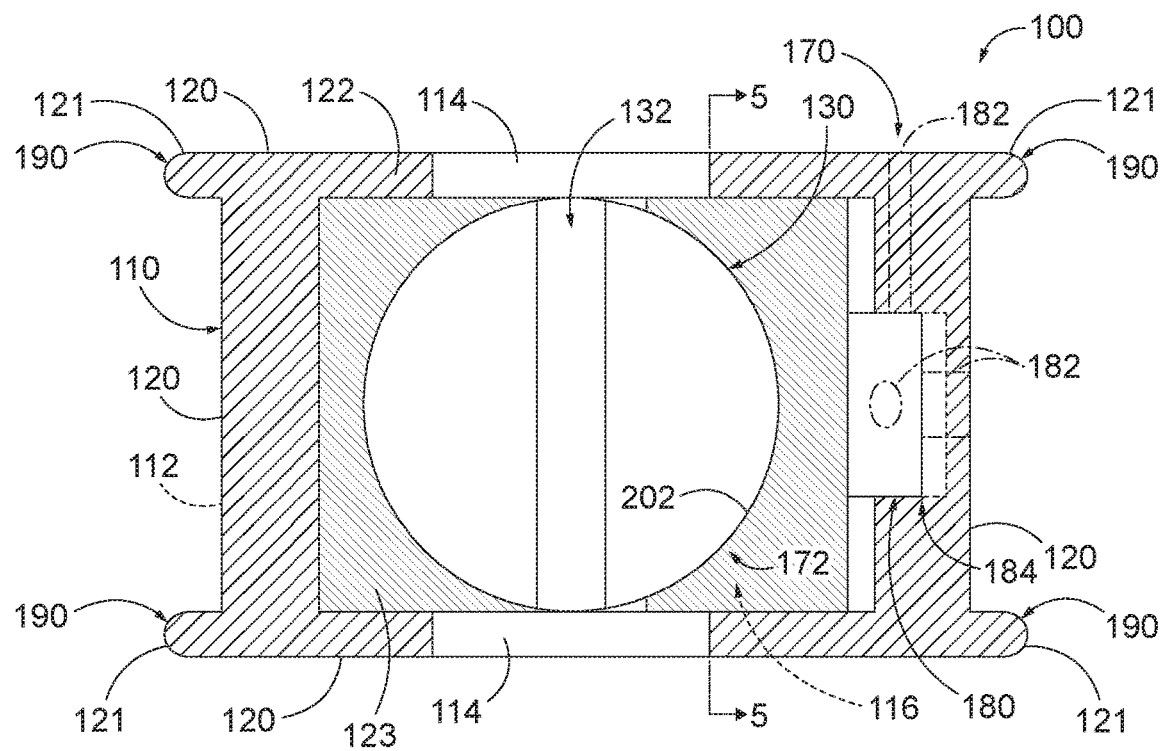
FIG. 2 is a schematic partial cross-sectional top view of the orthodontic bracket of FIG. 1.

In the engaged configuration, examples of which are schematically illustrated in FIGS. 1-2, core positioning assembly 170 retains core 130 at the selected prescriptive orientation, such as due to core clamp 200 being urged with sufficient force and/or otherwise maintained against the core by actuator 180. Thus, when external forces, which may be referred to as external adjustment forces, are imparted to the core, such as via archwire 95 and/or archwire slot 132, the core positioning assembly prevents the core from moving from the selected prescriptive orientation, at least as long as a threshold adjustment force is not exceeded. Examples of threshold adjustment forces that the core positioning assembly may be configured to withstand include forces of at least 0.06 pound-force (lbf), at least 0.07 lbf, at least 0.075 lbf, at least 0.08 lbf, at least 0.085 lbf, at least 0.09 lbf, at most 0.15 lbf, at most 0.14 lbf, at most 0.13 lbf, at most 0.12 lbf, at most 0.11 lbf, at most 0.1 lbf, at most 0.09 lbf, in the range of 0.06-0.12 lbf, in the range of 0.07-0.11 lbf, in the range of 0.073-0.09 lbf, and/or in the range of 0.075-0.085 lbf.

Figure 4:
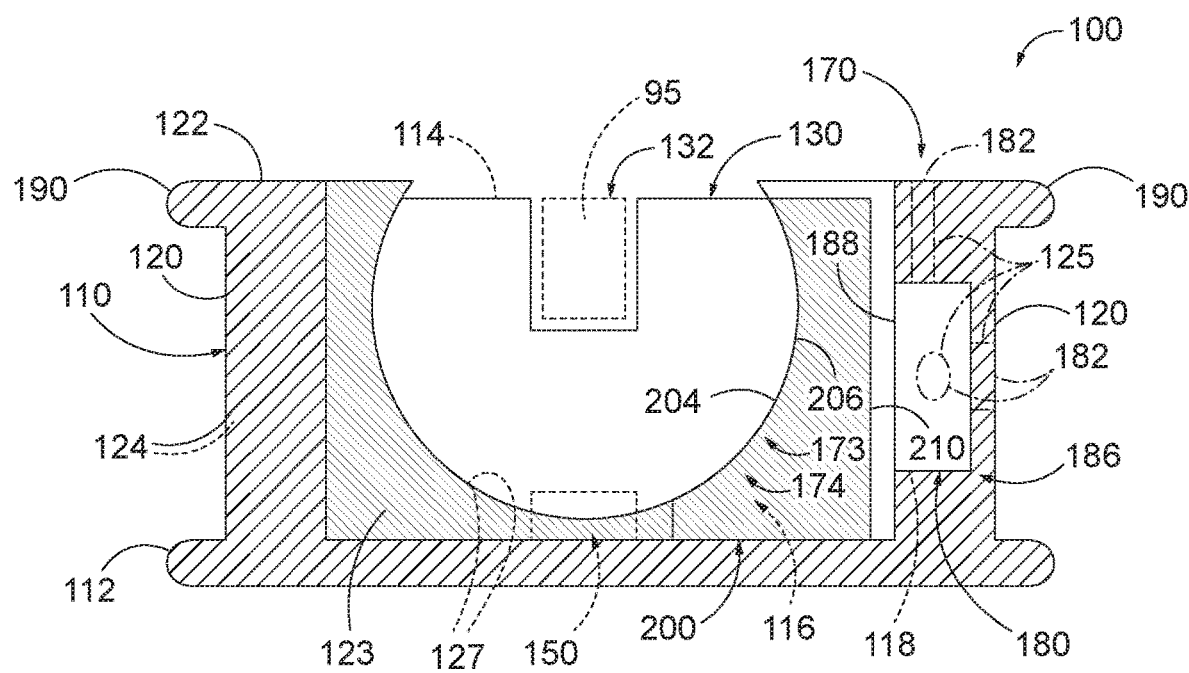
FIG. 4 is a schematic partial cross-sectional side view of the orthodontic bracket of FIG. 1 in another example of a disengaged configuration.

In contrast, when the core positioning assembly is in the disengaged configuration, examples of which are schematically illustrated in FIGS. 3-4, core positioning assembly 170 permits rotation of core 130 within core receptacle 116 and/or relative to bracket body 110 within the plurality of prescriptive orientations. FIG. 3 illustrates that core clamp 200 may be moved away from the core when the core positioning assembly is in the disengaged configuration, and FIG. 4 illustrates that it is not required in all embodiments for the core clamp to be moved away from the core when the core positioning assembly is in the disengaged configuration. Specifically, the disengaged configuration corresponds to configurations in which the core positioning assembly permits the orientation of the core to be moved from one of the plurality of prescriptive orientations to another of the plurality of prescriptive orientations. Thus, depending on the manner in which the core clamp engages the core and/or the force applied by the actuator, mere physical contact between the core clamp and the core may not prevent adjustment of the core to a new selected prescriptive orientation of the plurality of prescriptive orientations. For example, forces imparted to the core to move the core to a new selected prescriptive orientation may enable the core to rotate or otherwise move relative to the core clamp and/or may urge the core clamp to move away from the core, such as from the position shown in FIG. 3 to, or toward, the position shown in FIG. 4.

When the core positioning assembly is in the disengaged configuration, the position of the core may be adjusted by an orthodontist, dental practitioner, or other user by applying force to the core to move the core to a new selected position of the plurality of prescriptive orientations. This intentionally applied force may be referred to as an alignment force and/or as a directed force. For example, a tool, such as a pick, probe, screw driver, or the like may be inserted into the archwire slot, inserted into a tool-engaging portion 134 (shown in FIG. 36) of the core, or applied against the exterior of the core to move the core to a new selected prescriptive orientation. As discussed, the available paths or directions of movement of the core within the plurality of prescriptive orientations may be limited or defined by such factors as the shape of the core, the shape of the core receptacle, and/or any rotation-directing structure 150 (shown in at least FIG. 36 and in the incorporated patents). As discussed and incorporated herein, the mechanism and/or manner by which the core positioning assembly is configured or otherwise transitioned between the engaged configuration and the disengaged configuration may include one or more of rotation, translation, and/or pivoting. When two or more mechanisms or movement paths are utilized, they may be partially or completely sequential, or partially or completely concurrent, or partially concurrent and partially sequential.

As discussed, core positioning assembly 170 includes at least a core clamp 200 and an actuator 180. As schematically illustrated in FIGS. 1-4, core clamp 200 is at least partially positioned within core receptacle 116 and includes a clamp body 202 with a core engagement surface 204 that is configured to engage a surface region 206 of core 130, at least when the core positioning assembly is in the engaged configuration. Core clamp 200 additionally or alternatively may be referred to as a core detent 200, a core catch 200, a core brake 200, and/or a core lock 200.

In the schematic examples shown in FIGS. 1-4, clamp body 202 is shown having a box-like structure that is configured to translate or otherwise move toward and away from core 130. Core engagement surface 204 may form a portion of clamp body 202, such as being integrally formed with the clamp body, but it also is within the scope of the present disclosure that core engagement surface 204 of core clamp 200 may be attached to, adhered to, applied on, or otherwise coupled to the core body. Core engagement surface 204 thus may be formed from the same or different materials from the core clamp body.

Core engagement surface 204 may have a shape that corresponds to the shape of the portion of core 130 to which the core engagement surface is engaged when the core positioning assembly is in the engaged configuration. For example, if the core has an arcuate shape, such as by having an arcuate exterior surface at least in the region that is engaged by core engagement surface 204, the core engagement surface 204 may have the same or a very similar shape so that a contact region 208 is established between the core engagement surface of core clamp 200 and contact surface 206 of the core. As examples, core engagement surface 204, clamp engagement surface 206, and/or contact region 208 may be and/or include a concave, convex, conical, cylindrical, and/or wedge-shaped surface. Thus, if contact surface 206 of the core defines a radius or has a particular curvature or shape, core engagement surface 204 of clamp 200 may have the same or at least substantially the same radius or other particular curvature or shape to generate contact region 208. This region of the core that potentially may be engaged by the core engagement surface as the core is moved within the plurality of prescriptive orientations may be referred to as the contact surface 206 and/or as the clamp engagement surface 206 of the core.

Because the core is selectively moved between a plurality of prescriptive orientations, it follows that the contact surface 206 of the core is larger than the surface area of the core engagement surface 204. As an example, the surface area of the core engagement surface of the core may be at least 5%, at least 10%, at least 15%, at least 20%, at least 25%, at least 30%, at least 35%, at most 50%, at most 40%, at most 35%, at most 30%, at most 25%, at most 20%, at most 15%, in the range of 5-50%, in the range of 10-40%, and/or in the range of 15-35% of the surface area of the contact surface 206 of the core.

Core engagement surface 204 and/or contact surface 206 may be and/or include any suitable structure or material that may increase contact region 208 and/or to increase the frictional force between core positioning assembly 170 and core 130 within contact region 208. As an example, contact surface 206 may include and/or be a convex surface profile. As such, core engagement surface 204 may be referred to as a recess, a depression, a concave region, and/or a cavity within the core clamp. The concave surface profile of core engagement surface 204 may be shaped to receive contact surface 206 of core 130 and/or may have a radius that corresponds to and/or is equal to a radius of contact surface 206 of core 130.

The core clamp may frictionally engage the core and/or may create an interference fit with the core, at least when the core positioning assembly is in the engaged configuration. Core engagement surface 204 and/or contact surface 206 may include a friction-enhancing region 128. Friction-enhancing region 128 may be configured to increase the frictional force between the core and the core engagement surface. Examples of the friction-enhancing region include a roughened region, a resilient material, a high-friction material, a plurality of teeth, and/or a plurality of recesses.

Figure 5:
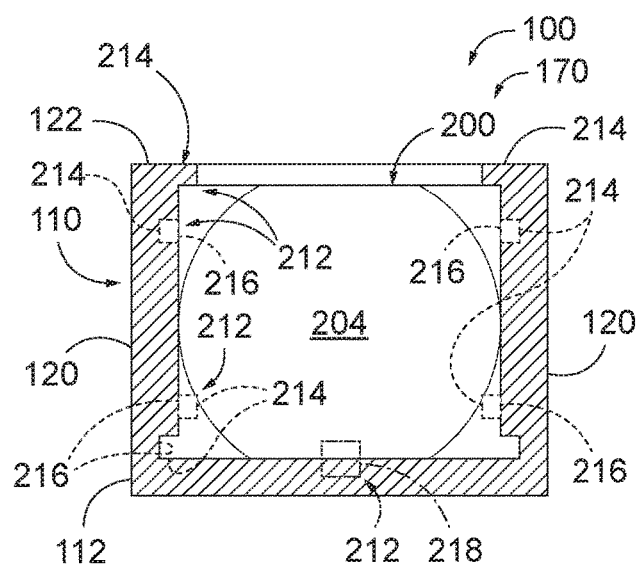
FIG. 5 is a schematic partial cross-sectional view taken along the line 5-5 in FIG. 2.

Core clamp 200 may be moved relative to core 130 and/or bracket body 110 in any suitable manner, such as by translating, sliding, and/or pivoting. Core clamp 200 and/or bracket body 110 thus may include and/or define guide structure 212 that establishes the path of movement of the core clamp with respect to the bracket body and/or the core. For example, when core clamp 200 is configured to translate or slide relative to the core and/or bracket body, the core clamp and/or bracket body may include and/or define one or more projections 214 and/or recesses 216 that inter-engage to define the path of movement of the core clamp. Examples of such projections and/or recesses are schematically illustrated in FIG. 5. As shown, projections 214 may extend from core clamp 200 and/or bracket body 110, and recesses 216 may be formed in or defined by core clamp 200 and/or bracket body 110. Projections 214 additionally or alternatively may be referred to as arms, legs, ears, ribs, and/or rails. Recesses 216 additionally or alternatively may be referred to as races, tracks, channels, and/or grooves. As another example, when core clamp 200 is configured to pivot with respect to the core and/or bracket body, guide structure 212 may include a pivot or hinge 218 that couples the core clamp to the bracket body, as schematically illustrated in FIG. 5 in dash-dot lines.

Actuator 180 is configured to secure the core clamp in engagement with the core to retain the core at the selected prescriptive orientation. The actuator may be selectively configured, such as responsive to an external force applied to an actuator receiver 182, between a locked position 184, as schematically illustrated in FIGS. 1-2, and at least one unlocked position 186, as schematically illustrated in FIGS. 3-4. In the locked position, the actuator secures the core clamp in engagement with the core, such as the contact surface 206 of the core, and retains the core in the selected prescriptive orientation of the plurality of prescriptive orientations. In the unlocked position(s), the core positioning assembly permits movement of the core from the selected prescriptive orientation to a different prescriptive orientation of the plurality of prescriptive orientations. In other words, in the unlocked position of the actuator, the core clamp is not sufficiently engaged against the contact region of the core by the actuator to prevent the core from being selectively moved to a different prescriptive orientation of the plurality of prescriptive orientations.

Actuator receiver 182 is oriented and/or otherwise positioned relative to bracket body 110 so that an orthodontist, dental practitioner, or other user may access the receiver to impart forces to the actuator, via the receiver, to configure the actuator between its locked and unlocked positions. For example, the actuator receiver may be sized and/or positioned to receive the tip of a tool through which user-applied forces are conveyed to the actuator. In FIGS. 1-4, examples of actuator receivers 182 are schematically illustrated in dash-dot lines extending at least partially or completely through a passage 125 in sidewall 120 and/or top 122 of the bracket body, and/or extending away from the bracket body. Examples of suitable structures for actuator receiver 182 include slots, bores, apertures, and/or sockets into which the tip of a tool may be inserted. Actuator receiver 182 additionally or alternatively may be referred to as a tool receiver 182 and/or as a receiver 182.

Actuator 180 may have a single locked position but may define more than one unlocked position, such as depending on the relative movement of the actuator relative to the core clamp. For example, the actuator may be configured to be incrementally or sequentially adjusted toward and/or away from the locked position, with all such positions that are not the locked position being examples of unlocked configurations. Correspondingly, when the actuator is in the locked position, the core positioning assembly is in the engaged configuration, and when the actuator is in an unlocked position, the core positioning assembly is in a disengaged configuration. Thus, the actuator may define one or more intermediate unlocked positions, and the core positioning assembly may be selectively configured in one or more intermediate disengaged configurations. Although not required to all embodiments, at least a portion of actuator 180 may be farther away from core 130 when the actuator is in an unlocked position than when the actuator is in the locked position. Similarly, and also not required to all embodiments, the core clamp may be positioned between and/or separate the actuator and the core when the actuator is in at least the locked position and optionally when the actuator is in the locked and the unlocked positions. Thus, it is within the scope of the present disclosure that the actuator may not engage the core directly when the actuator is in the locked or the unlocked positions.

Actuator 180 may take any suitable form to selectively urge the core clamp into engagement with the core with sufficient force to restrict movement of the core from a current prescriptive orientation of the plurality of prescriptive orientations to another of the plurality of prescriptive orientations. Examples of suitable forms for the actuator and/or components of the actuator include a cam, a wedge, a screw, a spring, and a lever. When actuator 180 includes a screw or other threaded shaft, actuator 180 may be referred to as a threaded actuator. For example, the threaded actuator may extend through a corresponding passage 125 in bracket body 110, with such a passage 125 being a threaded passage and/or referred to as a threaded socket in the bracket body.

Actuator 180 may be moved relative to core clamp 200 and/or bracket body 110 in any suitable manner, such as by translating, sliding, pivoting, and/or rotating. When actuator 180 rotates relative to the core clamp and/or bracket body, it may do so about a central axis or an eccentric axis. For example, when actuator 180 includes or forms a cam, actuator 180 may rotate about an eccentric axis to incrementally increase or decrease the force applied by the actuator against the core clamp. The manner of movement of the actuator relative to the core clamp and/or bracket body may be the same as or different from the manner of movement of the core clamp relative to the core and/or the bracket body. As examples, the core clamp may translate or slide responsive to the actuator rotating or pivoting. As additional examples, the core clamp may pivot responsive to the actuator rotating, pivoting, or translating.

Movement of actuator 180 relative to core clamp 200 includes movement that is independent of movement of core clamp 200 (i.e., asynchronous movement), as well as movement that is concurrent and/or synchronous movement with movement of the core clamp. For example, actuator 180 may be selectively moved into and out of engagement with the core clamp as actuator 180 is moved between its locked and unlocked positions. Prior to engagement of the core clamp by the actuator, the actuator may move independent of the core clamp, and after engagement of the core clamp by the actuator, further movement of the actuator toward its locked position will result in corresponding movement of the core clamp toward the core. When the actuator is in the locked position, the actuator positively engages the core clamp and secures the core clamp against the core to restrict the core from being moved from its current prescriptive orientation to another prescriptive orientation of the plurality of prescriptive orientations.

As discussed with respect to FIGS. 3-4, when the actuator is moved from its locked position to an unlocked position, this movement of the actuator may or may not cause corresponding movement of the core clamp away from the core. When the actuator is coupled to the core, movement of the actuator from the locked position to the unlocked position (and thus configuring of the core positioning assembly from the engaged configuration to the disengaged configuration) may cause the core clamp to move away from the core, such as to permit the core to be positioning to a different prescriptive orientation or the plurality of prescriptive orientations. When the actuator is not coupled or attached to the core clamp, movement of the actuator from the locked position to the unlocked position may not cause the core clamp to move away from the core. However, the movement of the actuator to an unlocked position still may enable the core to be selectively repositioned to another prescriptive orientation of the plurality of prescriptive orientations, such as responsive to application of an alignment force by an orthodontist or other dental practitioner. In such a configuration, the application of the alignment force to the core and corresponding movement of the core may result in movement of the core clamp away from the core.

Engagement between the actuator and the core clamp may involve contact between an actuator engagement surface 210 of the core clamp and a clamp engagement surface 188 of the actuator. The corresponding region of contact between actuator engagement surface 210 and clamp engagement surface 188 may be referred to as an engagement region 220 and/or as a actuator-clamp engagement region 220. Similar to the previously discussed core engagement surface 204 and clamp engagement surface 206, and contact region 208 of the core and core clamp, actuator engagement surface 210, clamp engagement surface 188, and/or engagement region 220 may have the same or similar shapes, such as concave, convex, conical, and/or wedge-shaped shapes or surfaces. Additional examples include planar, stepped, sawtoothed, threaded, and/or cylindrical shapes or surfaces.

It is within the scope of the present disclosure that actuator engagement surface 210 and clamp engagement surface 188 may have dissimilar shapes, which may result in engagement region 220 having a smaller surface area than the corresponding contact region 208 between the core and the core clamp. In such examples, the engagement region 220 may have a surface area that is less than 75%, less than 50%, less than 40%, less than 30%, less than 25%, less than 20%, less than 10%, at most 90%, at most 75%, at most 50%, at most 40%, at most 25%, in the range of 50-90%, in the range of 25-75%, and/or in the range of 10-50% of the surface area of contact region 208.

As discussed, at least a portion of the actuator may extend within an actuator receptacle 118 of the bracket body, at least when the actuator is in an unlocked position. In such a configuration, when the actuator is moved to the locked position, a greater portion or even all of the actuator may extend out of the actuator receptacle, such as into core receptacle 116. Although not required to all embodiments, at least a portion of core clamp 200 also may extend into actuator receptacle 118, such as when the actuator is in the locked position.

Core positioning assembly 170 optionally may include an actuator biasing mechanism 230, as schematically illustrated in FIG. 1 that is configured to bias the actuator to the locked position and/or to resist movement of the actuator from the locked position to an unlocked position. Accordingly, actuator biasing mechanism 230 additionally or alternatively may be described as biasing the core positioning assembly to the engaged configuration, biasing the core clamp into engagement with the core, resisting movement of the core positioning assembly from the engaged configuration to a disengaged configuration, and/or resisting movement of the core clamp away from the core. Actuator biasing mechanism 230 thus additionally or alternatively may be referred to as core positioning assembly biasing mechanism 230 and/or as core clamp biasing mechanism 230. When present, actuator biasing mechanism 230 may include any suitable structure or material, such as one or more springs, resilient materials, and/or elastomeric materials. For example, one or more springs and/or resilient materials/members may be positioned within the bracket body and/or may engage the actuator to urge the actuator to, or to remain in, its locked position. As another example, an elastomeric material/member may extend between the actuator and the bracket body to urge the actuator to, or to remain in, its locked position.

Figure 35:
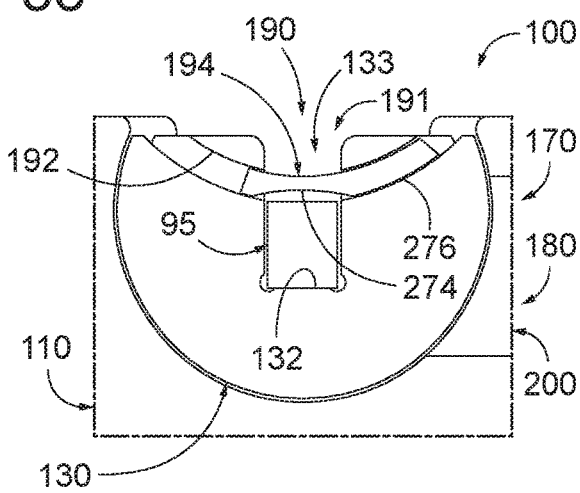
FIG. 35 is another fragmentary view of the orthodontic bracket of FIGS. 31-34.
Figure 36:
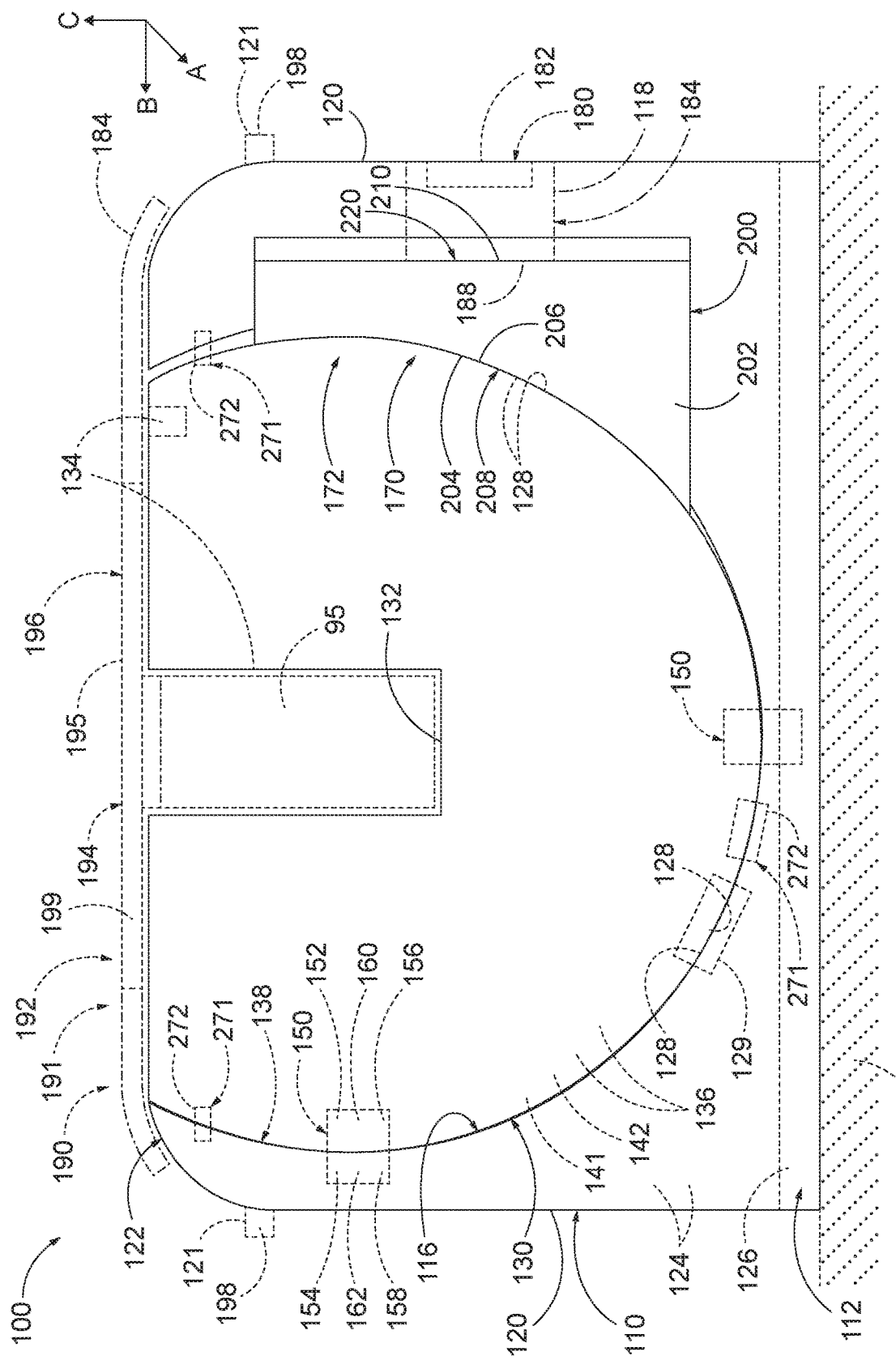
FIG. 36 is a schematic partial cross-sectional view of additional examples of orthodontic brackets according to the present disclosure.

FIGS. 9-36 provide additional examples of orthodontic brackets 100, components of brackets 100, and/or features of brackets 100 according to the present disclosure. The orthodontic brackets 100 of FIGS. 9-35 may include and/or be more detailed examples of the brackets 100 of FIGS. 1-5, and any of the structures, functions, and/or features discussed herein with reference to brackets 100 of FIGS. 1-5 may be included in and/or utilized with brackets 100 of FIGS. 9-35 without departing from the scope of the present disclosure. Similarly, any of the structures, functions, and/or features discussed herein with reference to brackets 100 of FIGS. 9-35 may be included in and/or utilized with brackets 100 of FIGS. 1-5. In addition, FIG. 36 provides still further examples of orthodontic brackets 100, components of brackets 100, and/or features of brackets 100 according to the present disclosure. The orthodontic brackets 100 of FIG. 36 may include and/or be more detailed examples of the brackets 100 of FIGS. 1-35, and any of the structures, functions, and/or features discussed herein with reference to brackets 100 of FIGS. 1-35 may be included in and/or utilized with brackets 100 of FIG. 36 without departing from the scope of the present disclosure.

Figure 9:
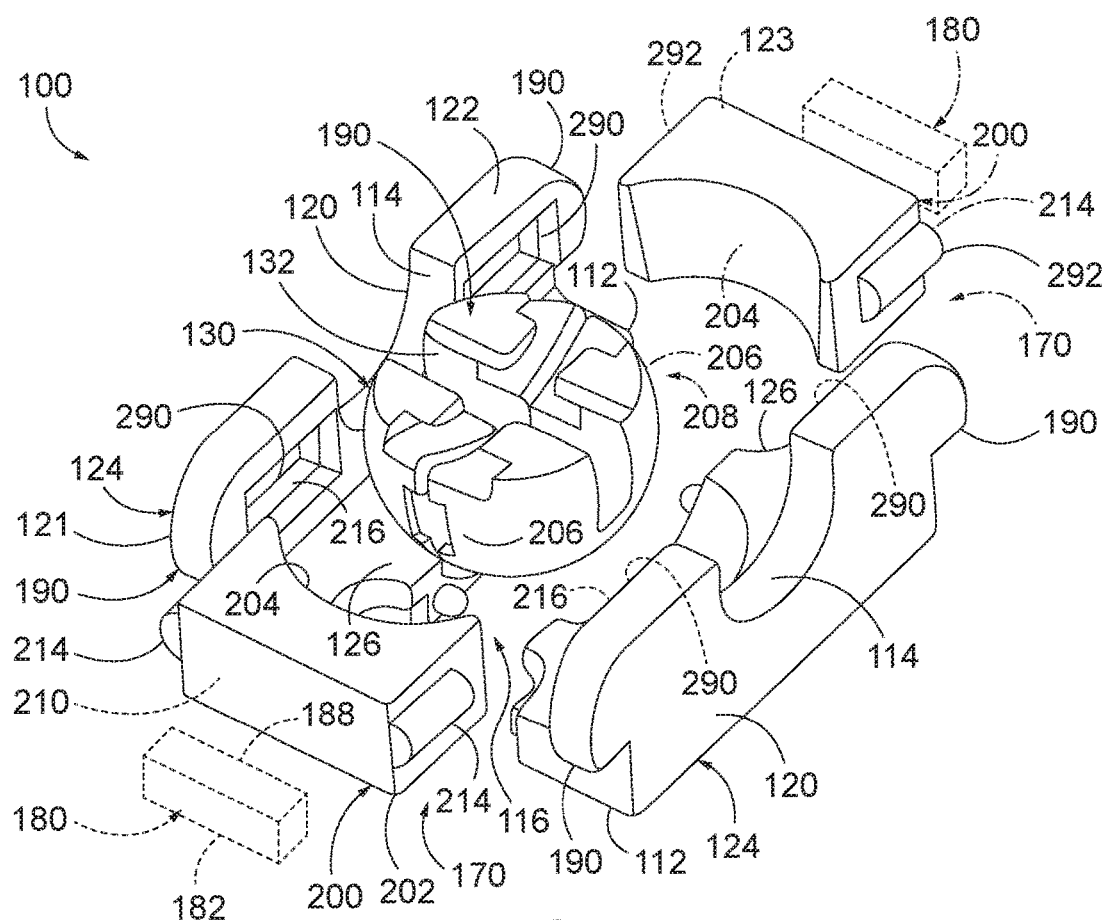
FIG. 9 is an exploded top isometric view of an example of an orthodontic bracket according to the present disclosure.

Although brackets 100 are primarily illustrated and described herein with a core positioning assembly 170 that includes a single core clamp 200 and a single actuator 180, it is within the scope of the present disclosure that a bracket 100 may include a core positioning assembly 170, may include more than one core clamp 200, and/or more than one actuator 180, as schematically illustrated in dash-dot lines in FIGS. 1 and 9. As an example, when core positioning assembly 170 includes a pair of core clamps 200, the core clamps may be configured to engage spaced-apart contact surfaces 206 of core 130, such as contact surfaces 206 on opposed sides of the core. When core positioning assembly 170 includes a pair of core clamps 200, it is further within the scope of the present disclosure that each core clamp may be selectively moved between engaged and disengaged configurations responsive to respective actuators 180 being selectively configured between locked and unlocked positions. When core positioning assembly 170 includes more than one core clamp 200 and/or more than one actuator 180, the core clamps and/or actuators may have the same or different structures, such as corresponding to the same or different ones of the core clamps and/or actuators that are disclosed herein.

To simplify the drawings of the present disclosure, optional second core clamps 200 and/or actuators 180 are not illustrated in connection with each illustrated example of brackets 100, with FIGS. 1 and 9 instead schematically representing that any of the disclosed embodiments may be implemented with two or more actuators and/or core clamps. When so implemented the individual (i.e., first and second) actuators and/or core clamps may have any of the components, structures, features, etc. that are disclosed herein, and the pair of actuators and/or core clamps are not required to have the same or different components, structures, features, etc. To further simplify the drawings, components, structures, features, etc. that are labelled in some of FIGS. 1-36 may not be repeated in all of FIGS. 1-36, especially when such components, structures, features, etc. are repeated in subsequent figures after being described and labeled in connection with an initial figure.

Figure 10:
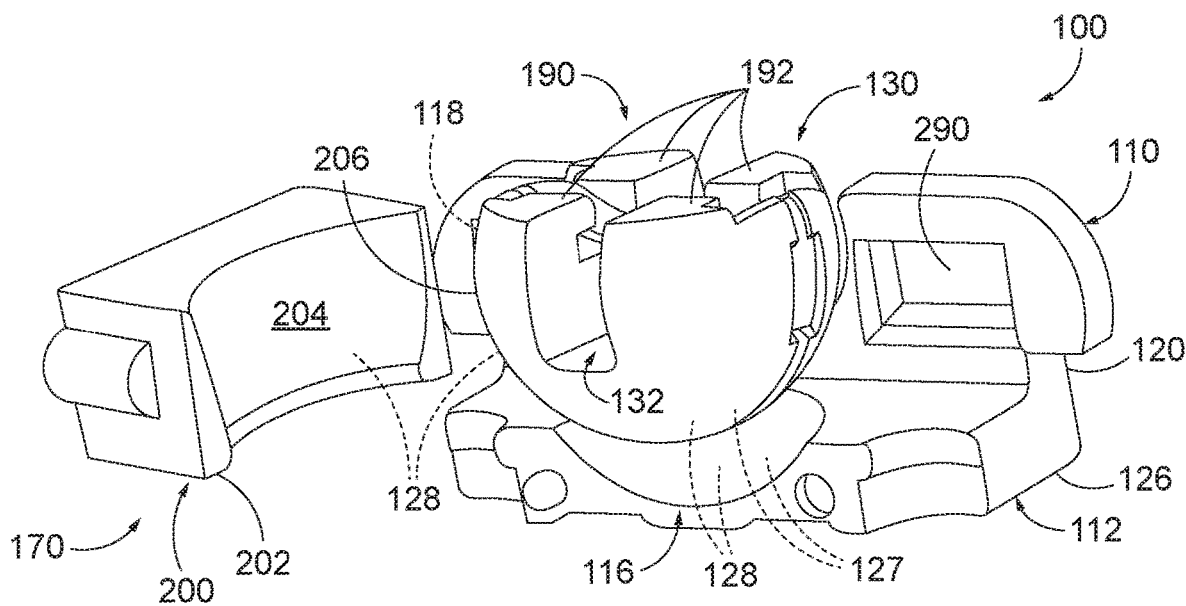
FIG. 10 is an exploded side isometric view of portions of the orthodontic bracket of FIG. 9.
Figure 11:
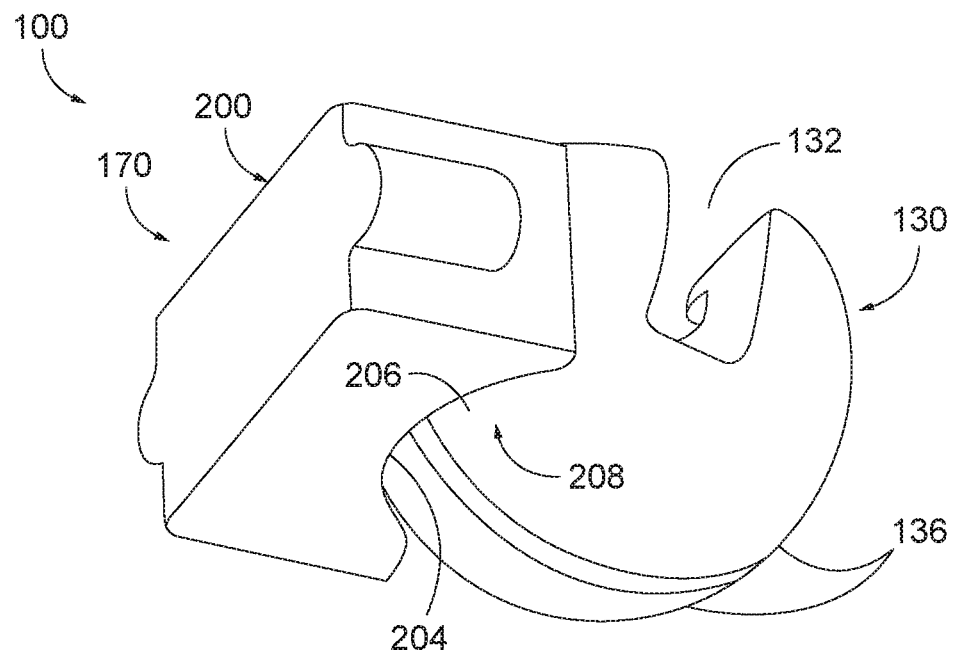
FIG. 11 is a bottom isometric view showing the core and core clamp of the orthodontic bracket of FIG. 9.

FIGS. 9-11 provide less schematic examples of orthodontic brackets 100 according to the present disclosure. In the illustrated example, bracket body 110 includes a pair of bracket sections 124 that each includes a base section 126 and a sidewall 120. The example of bracket body 110 in FIGS. 9-11 illustrates that the bracket body may be formed from a plurality of bracket sections that are secured together, such as by welding, brazing, or adhesion during assembly of the bracket. As illustrated, the bracket sections are identical to each other, which may reduce the tooling and/or assembly requirements to produce bracket 100, but this is not required to all brackets 100 according to the present disclosure. In FIGS. 9-11, core 130 is illustrated to provide an example of a core that may be formed from a plurality of core sections 136 (as labelled in FIG. 11), and core 130 is illustrated as including a ligating structure 190 that includes ligating structure receptacles 192 (labelled in FIG. 10) that receive a closure that enable bracket 100 to be a self-ligating orthodontic bracket. Any of the other cores 130 that are disclosed herein may be used in place of the illustrated example of FIGS. 9-11, just as the example of core 130 shown in FIGS. 9-11 may be used with other examples of the brackets 100 disclosed herein. FIG. 10 also graphically depicts that core 130 and bracket base 112 optionally may include friction-enhancing regions 128 and/or may form guide surfaces 127.

The illustrated examples of bracket sections 124 each also include a pair of recesses 290 into which projections 214 of core clamp 200 and/or projections 292 of a spacer 123 are received. When spacer 123 is utilized, the projections 292 and corresponding recesses 290 may be sized to provide an interference fit or otherwise to enable the spacer to be secured in a fixed position relative to the bracket sections, such as by brazing, welding, or adhesion. In contrast, the recesses 290 into which projections 214 of core clamp 200 are received are sufficiently larger than the projections such that the core clamp may translate or otherwise move toward and away from core 130 as the core positioning assembly is configured between its engaged and disengaged configurations. The recesses 290 into which projections 214 of core clamp 200 are received additionally or alternatively provide examples of a core receptacle 116 into which portions of the core positioning assembly (namely, projections 214) extend.

In FIG. 9, core positioning assembly 170 is shown schematically as including an actuator 180 with a receiver 182 and a core clamp engagement surface 188 that is configured to engage an actuator engagement surface 210 of core clamp 200. This schematic representation is intentional to represent that the bracket 100 of FIGS. 9-11 may be configured for use with any of the actuators 180 and/or core clamps 200 disclosed herein. FIGS. 12-26 provide less schematic examples of such configurations.

Figure 12:
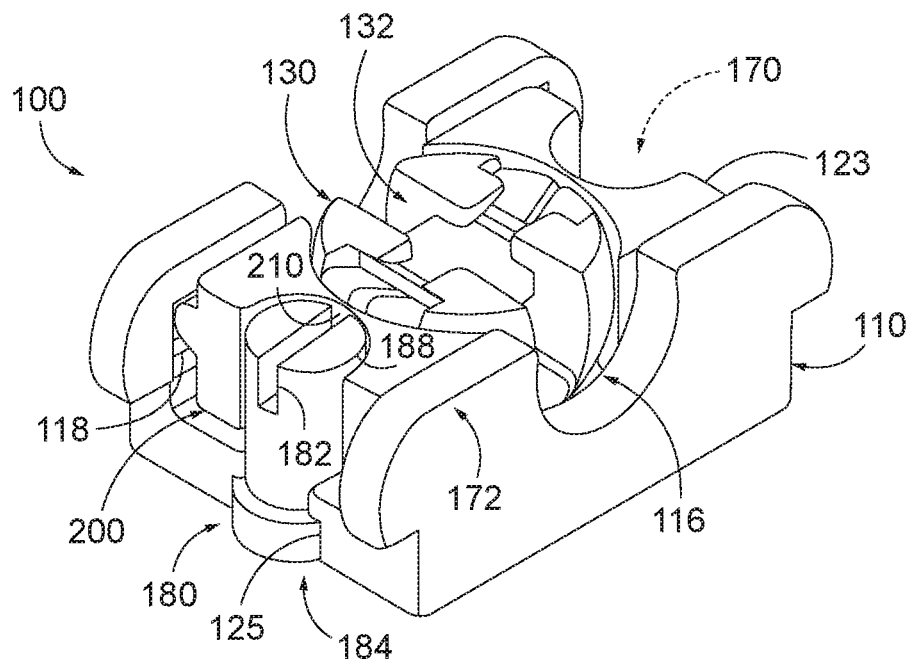
FIG. 12 is a top isometric view showing another example of an orthodontic bracket according to the present disclosure.
Figure 13:
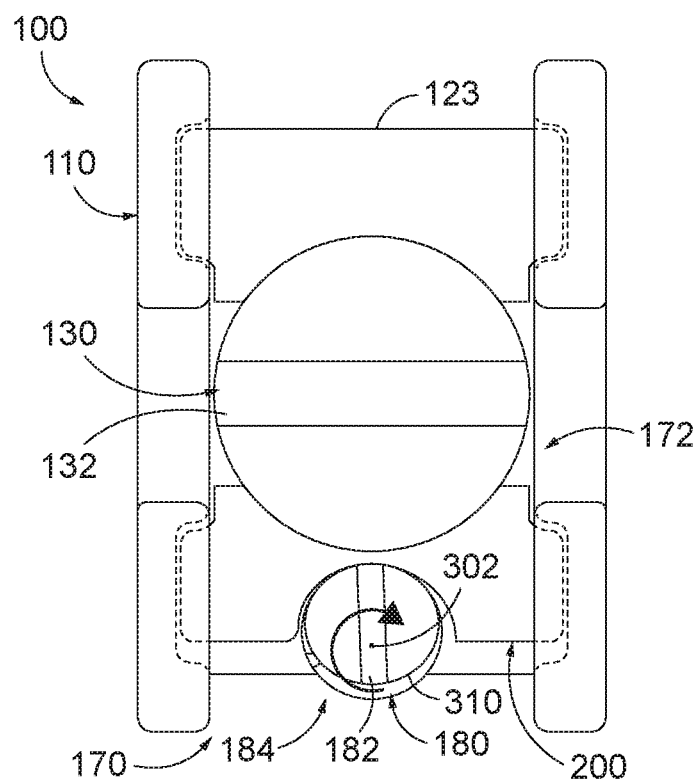
FIG. 13 is a fragmentary top plan view showing the orthodontic bracket of FIG. 12 with a core positioning assembly in an engaged configuration.
Figure 14:
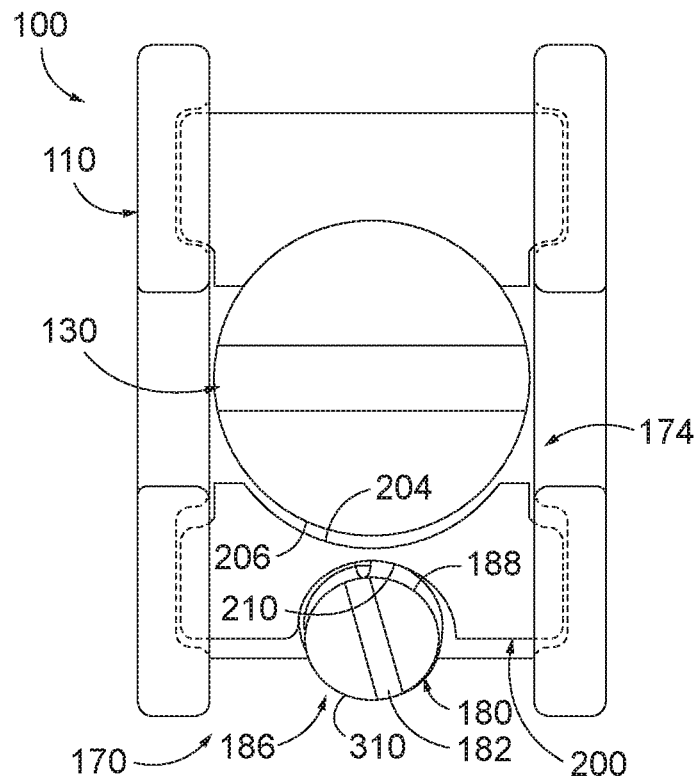
FIG. 14 is a fragmentary top plan view showing the orthodontic bracket of FIG. 12 with the core positioning assembly in a disengaged configuration.

FIGS. 12-14 provide an example of the bracket of FIGS. 9-11 implemented with an actuator that is configured to rotate relative to the bracket body 110 and/or core 130 as the actuator is moved between its locked and unlocked positions to correspondingly configure the core positioning assembly between its engaged and disengaged configurations. FIGS. 12-14 include a simplified representation of core 130, but any of the cores that are disclosed herein may be utilized with the bracket 100 of FIGS. 12-14 and/or other brackets 100 that also are illustrated with a simplified core 130.

As shown in FIGS. 12-14, actuator 180 is and/or includes a cam 300 that forms core clamp engagement surface 188 of the actuator. In the illustrated example, cam 300 (and thus actuator 180) has a convex and/or arcuate configuration, with core clamp 200 including a concave and/or arcuate actuator engagement surface 210. In the illustrated example, cam 300 rotates about an eccentric axis 302 (labelled in FIG. 13) of the actuator that extends transverse to the bracket base, although other relative orientations of the actuator and/or its eccentric axis may be utilized. As the cam is rotated to move the actuator from its unlocked position to its locked position, cam 300 urges core clamp 200 into positive engagement with core 130. Thus, rotation of the actuator relative to the bracket body, core, and/or core clamp may cause sliding or other translational movement of the core clamp.

In FIG. 13, actuator 180 is shown in a locked position 184, with core positioning assembly 170 shown in an engaged configuration 172. In FIG. 14, actuator 180 is shown in an unlocked position 186, and core positioning assembly 170 is shown in an example of a disengaged configuration 174. As illustrated, core engagement surface 204 of core clamp 200 is spaced apart from core contact surface 206 of core 130. As discussed, this spaced relationship between surfaces 204 and 206 is not required in all embodiments for core positioning assembly 170 to be in a disengaged configuration 174.

In FIGS. 12-14, actuator receiver 182 includes a tool-receiving slot, which additionally or alternatively may be described as a tool-receiving aperture, although other implementations of actuator receiver 182 may be utilized. As illustrated, actuator receiver 182 projects away from bracket base 112 without extending through a passage 125 in the bracket body 110, although it is within the scope of the disclosure that the bracket may include a top, or top surface, with a passage through which the actuator receiver 182 at least partially extends or at least through which the tip of a tool may be inserted to apply sufficient force to the actuator to move the actuator between its locked and unlocked configurations. Although actuator receiver 182 is not illustrated as extending into or through a passage 125 in bracket body 110, FIG. 12 provides an example of a bracket body 110 that includes a passage 125 through which a portion of core positioning assembly 170 (namely, actuator 180) extends.

Figure 15:
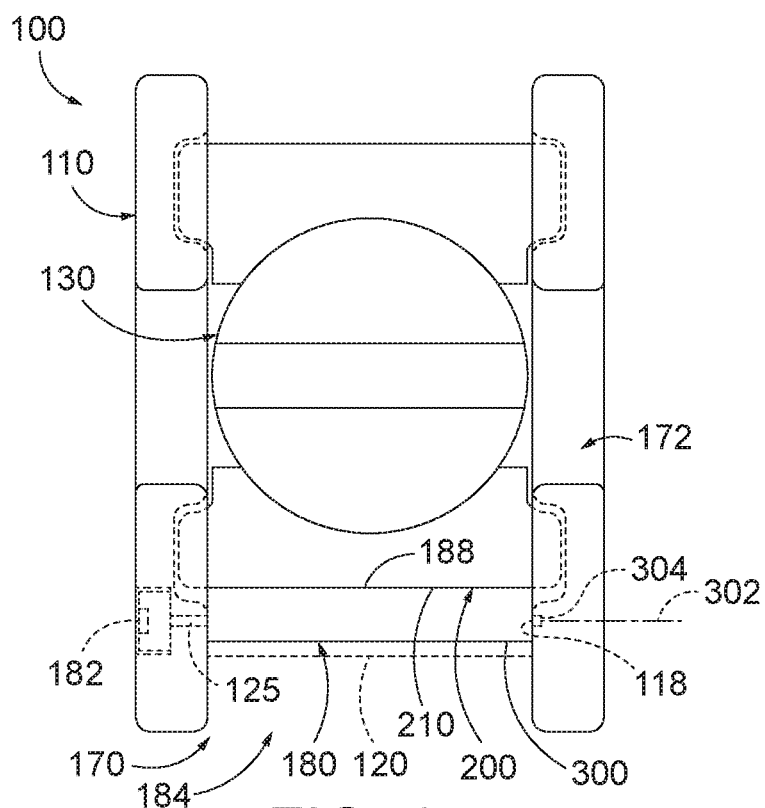
FIG. 15 is a schematic top plan view showing another example of an orthodontic bracket according to the present disclosure with a core positioning assembly in an engaged configuration.
Figure 16:
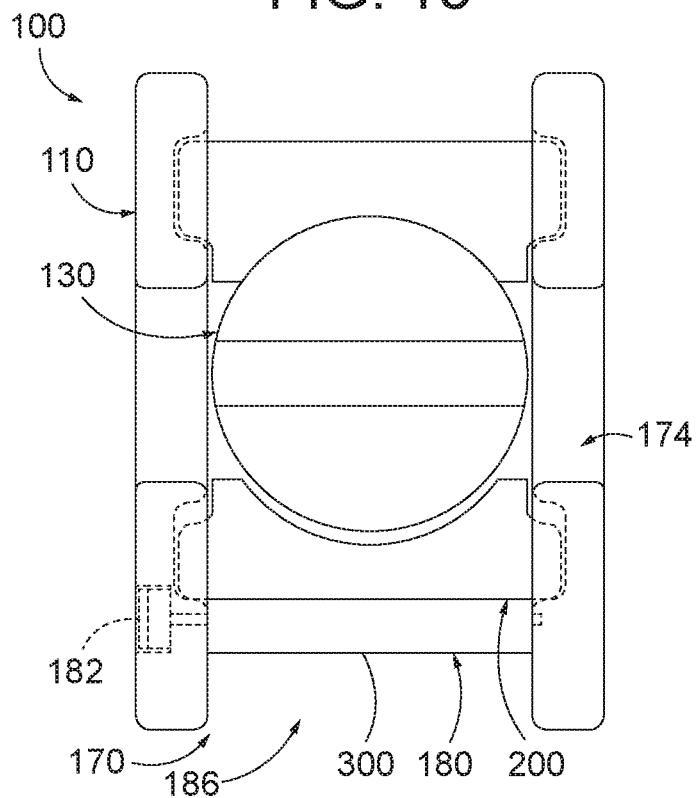
FIG. 16 is a schematic top plan view showing the orthodontic bracket of FIG. 15 with the core positioning assembly in a disengaged configuration.

FIGS. 15-16 provide another example of a bracket 100 with a core positioning assembly 170 that includes an actuator 180 that includes a cam 300. In the example of FIGS. 15-16, actuator 180 rotates about an eccentric axis 302 that extends parallel to bracket base 112. The example of an actuator 180 shown in FIGS. 15-16 includes an actuator receiver 182 that extends at least partially through a passage 125 in bracket body 112, namely, a passage 125 in sidewall 120. In solid lines in FIGS. 15-16, a portion of cam 300 that faces away from core 130 is shown being exposed or otherwise not enclosed within bracket body 110. This is not required to all embodiments, and it is within the scope of the present disclosure that such an actuator alternatively may be enclosed within the bracket body 110, such as schematically illustrated in FIG. 15 with dashed sidewall 120. FIG. 15 also provides another example of an actuator receptacle 118 into which a portion of the core positioning assembly 170 (namely, an axle 304 of actuator 180) extends.

Figure 17:
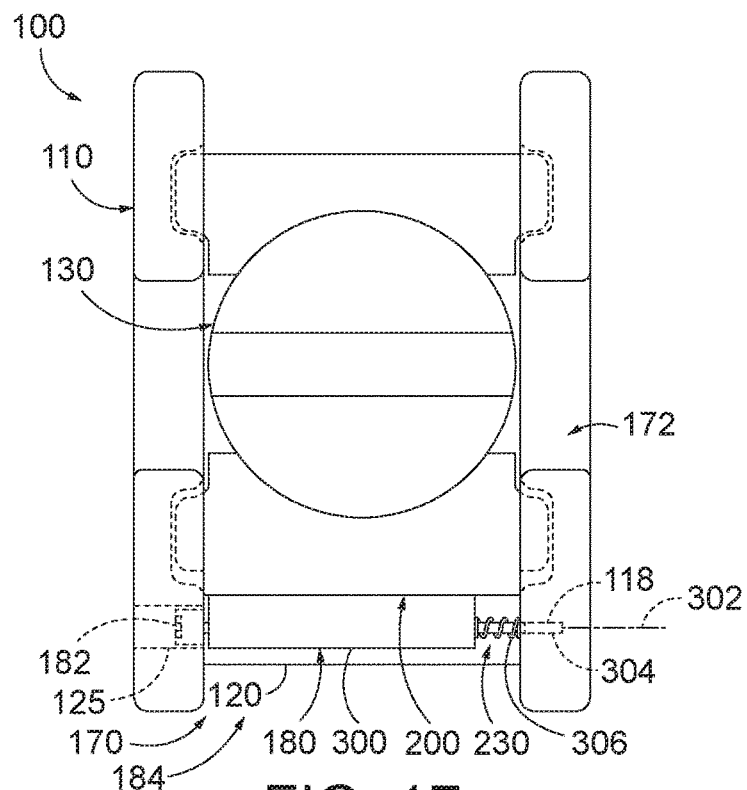
FIG. 17 is a schematic top plan view showing another example of an orthodontic bracket according to the present disclosure with a core positioning assembly in an engaged configuration.
Figures 18, 19:
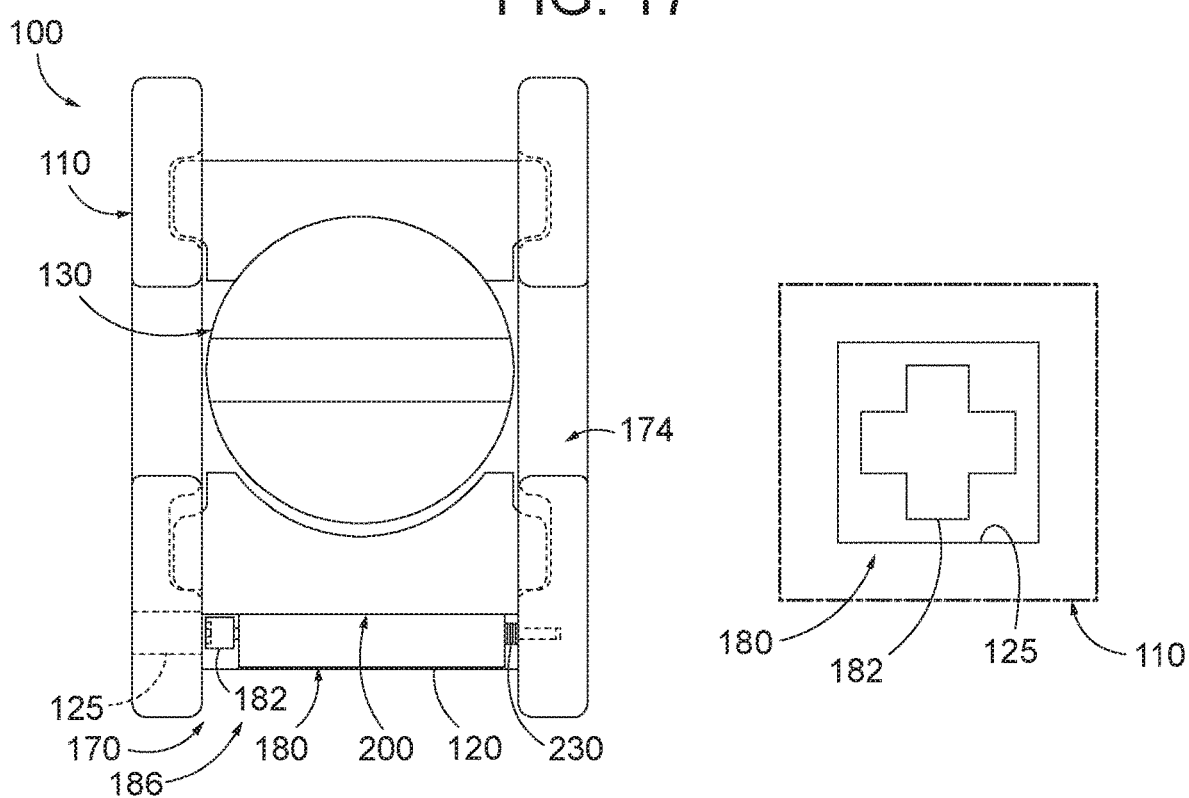
FIG. 18 is a schematic top plan view showing the orthodontic bracket of FIG. 15 with the core positioning assembly in a disengaged configuration.
FIG. 19 is a fragmentary side elevation view showing a portion of the actuator of the orthodontic bracket of FIGS. 17-18.

FIGS. 17-18 illustrate a variant of the bracket and core positioning assembly of FIGS. 15-16. Specifically, actuator 180 is shown including an actuator biasing mechanism 230, which in this example is depicted as a spring 306, that is configured to bias the actuator to move to, or toward, a particular position. In the illustrated example, actuator biasing mechanism 230 is configured to bias the receiver 182 of the actuator into a passage 125 in sidewall 120 of the bracket base. This construction provides a lock for the actuator and/or core positioning assembly 170, as rotation of the actuator is prevented when the receiver is at least partially received into passage 125.

When an orthodontist, dental practitioner, or other user wants to move the actuator between its locked and unlocked positions (and thus configure the core positioning assembly between its engaged and disengaged configurations), sufficient force is applied to the actuator receiver to overcome the biasing force (i.e., spring force) that urges the receiver to remain within the passage. After the receiver is pushed out of passage 125, the actuator may be rotated (such as by applying torque to receiver 182) to rotate the actuator relative to the bracket body 110, core clamp 200, and/or core 130. The actuator may be rotated by one or more predetermined increments, at which point release of applied force to receiver 182 (or at least reduction in the force to be less than the biasing force) enables the actuator biasing mechanism to return receiver 182 into passage 125. Once reinserted, further rotation of the actuator relative to the bracket body is prevented until the receiver is again urged out of the passage.

FIG. 19 provides an example of a suitable construction for receiver 182 and passage 125, with the illustrated example depicting the receiver and passage both having a square shape that defines four distinct rotational positions of the actuator relative to the bracket body, core clamp, and core. It is within the scope of the present disclosure that the receiver and passage may have other geometric shapes, such as to define two, three, five, six, or more than six distinct rotational positions of the actuator.

Figure 20:
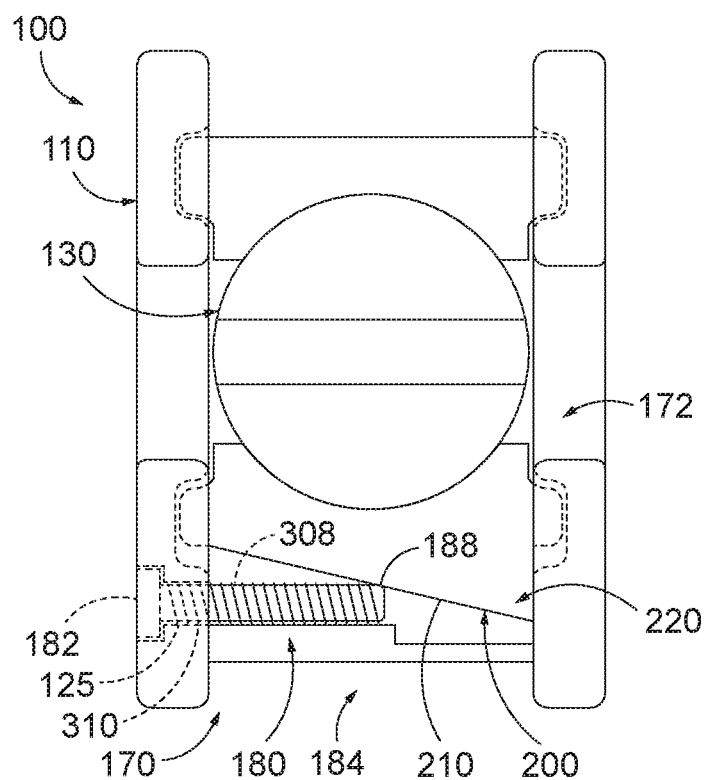
FIG. 20 is a schematic top plan view showing another example of an orthodontic bracket according to the present disclosure with a core positioning assembly in an engaged configuration.
Figure 21:
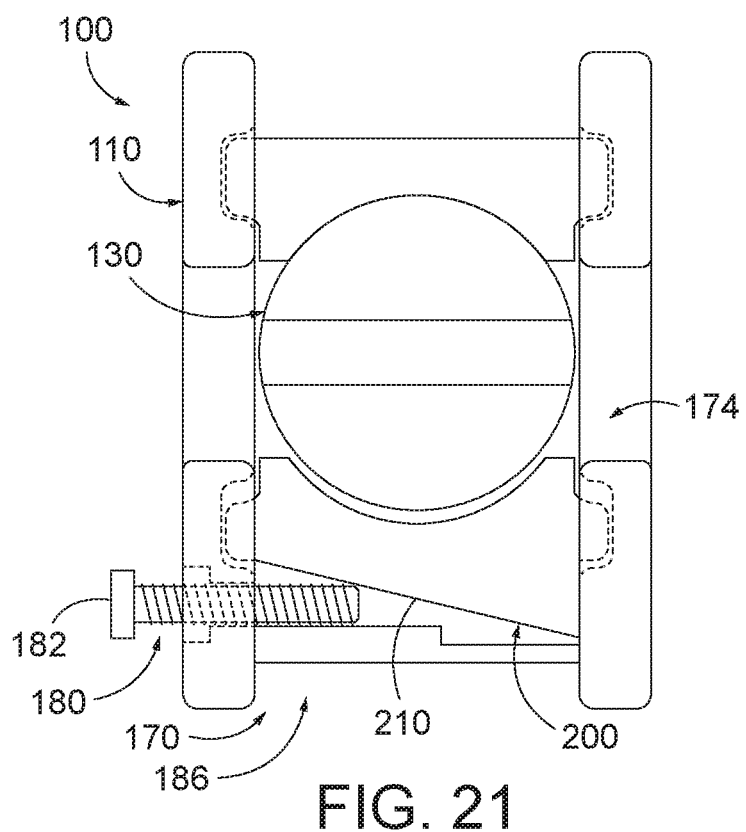
FIG. 21 is a schematic top plan view showing the orthodontic bracket of FIG. 20 with the core positioning assembly in a disengaged configuration.

FIGS. 20-21 provide another example of a bracket 100 with a core positioning assembly 170 having an actuator 180 that is selectively rotated relative to the bracket body 110, core clamp 200, and/or core 130 to move the actuator between its locked and unlocked configurations, with the corresponding core clamp 200 providing another example of a core clamp that slides or otherwise translates relative to the actuator 180, bracket body 110, and/or core 130. In the illustrated example, core clamp 200 has a planar actuator engagement surface 210. The illustrated engagement surface 210 additionally or alternatively may be described as extending at a skew angle to sidewalls 120 of the bracket body. Core clamp body 202 also may be described as having a wedge-shaped configuration.

In FIGS. 20-21, actuator 180 provides another example of an actuator that rotates relative to the bracket body, core clamp, and/or core to move the actuator between its locked and unlocked configurations and/or to configure the core positioning assembly between its engaged and disengaged configurations. As shown, actuator 180 is a threaded actuator that is threadingly received through a threaded passage in the bracket body 110. Specifically, actuator 180 includes a threaded shaft 308, and passage 125 takes the form of a threaded passage 310. Rotation of cam 300 relative to bracket body 110 causes the cam to move toward or away from the actuator engagement surface 210 of the core clamp. As shown, the core clamp engagement surface 188 of the actuator is a threaded engagement surface, although it also is within the scope of the present disclosure that the portion of the threaded actuator that engages actuator engagement surface 188 of the core clamp may not be threaded and/or may be shaped to provide a greater surface area of contact with the actuator engagement surface.

Figure 22:
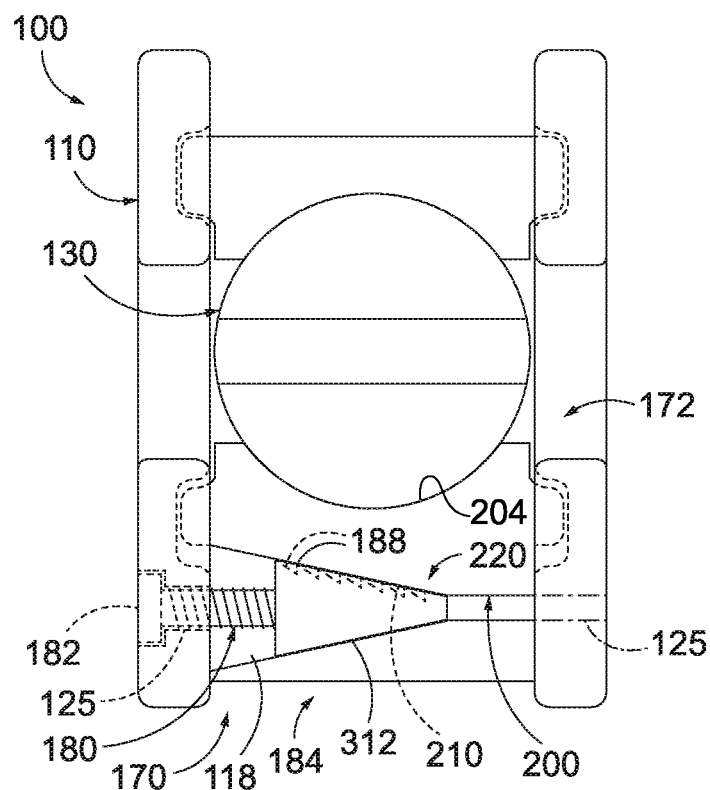
FIG. 22 is a schematic top plan view showing another example of an orthodontic bracket according to the present disclosure with a core positioning assembly in an engaged configuration.
Figure 23:
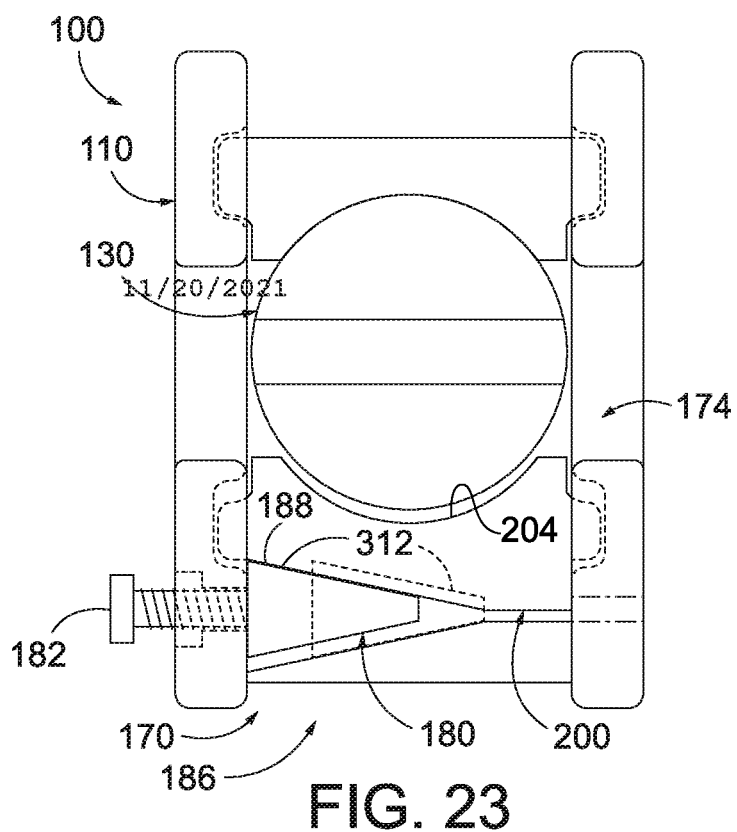
FIG. 23 is a schematic top plan view showing the orthodontic bracket of FIG. 22 with the core positioning assembly in a disengaged configuration.

FIGS. 22 and 23 provide an example of such an embodiment, with actuator 180 still including a threaded shaft 308 that is threadingly engaged with a threaded passage 310 of the bracket body, but with actuator 180 also including an actuator engagement surface 210 that is shaped to correspond to the shape of actuator engagement surface 188. As shown in solid lines, core clamp engagement surface 210 has a conical and/or convex configuration, and it is within the scope of the present disclosure that actuator engagement surface 188 may have a planar, convex or concave configuration. Of these options, a concave configuration that corresponds to the shape of the core clamp engagement surface will increase the surface area of the corresponding engagement region 220, but it is not required.

FIG. 23 depicts in solid lines that the core clamp engagement surface 188 of the actuator, (namely, conical portion 312) may move with the threaded shaft as the threaded shaft is rotated in both clockwise and counterclockwise directions. As shown in dashed lines in FIG. 23, it also is within the scope of the present disclosure that the portion of actuator 180 that includes core clamp engagement surface 188 may be separate from the portion of actuator 180 that includes receiver 182. In such a configuration, moving the actuator to the locked position will include concurrent movement of both portions of the actuator; however, movement of the actuator receiver portion of the actuator away from the locked position will not automatically cause a corresponding movement of the core clamp engagement portion of the actuator. Instead, separate forces may need to be applied to this portion of the actuator to move it from the locked position to an unlocked position. For example, the tip of a tool may be inserted through a passage 125, such as the passage shown in dash-dot lines in FIGS. 22 and 23, to move this portion of the actuator from the locked position to an unlocked position. As should be apparent from the dashed conical portion of the actuator shown in FIG. 23, the core clamp may not be moved away from the core until after this portion of the actuator is moved away from its position that the actuator established when the actuator was in its locked position.

As another variant, the portion 312 and the core clamp's actuator engagement surface may have other relative orientations. As an example, portion 312 may be oriented in the opposite direction (with its larger diameter portion distal the threaded portion of the actuator and its smaller diameter portion proximal the threaded portion of the actuator), with the core clamp's actuator engagement surface correspondingly skewed in the opposite direction. In such an embodiment, the threaded portion of the actuator may be configured to draw portion 312 toward and away from receiver 182. For example, the threaded portion of the actuator may not be drawn out of the bracket body, and instead portion 312 may be threaded to be drawn toward and away from receiver 182 as the receiver is rotated. Thus, as portion 312 is drawn toward receiver 182, the actuator may urge the core clamp (and thus core positioning assembly 170) to/toward its engaged configuration, and as portion 312 is urged away from receiver 182, the actuator may urge the core clamp (and thus core positioning assembly 170) to/toward its disengaged configuration.

As a further variant, portion 312 may form the entirety of the actuator, with external forces being applied to the actuator (such as by tool tips inserted through passages 125) to translate or otherwise move the actuator relative to the core clamp and/or bracket body. In FIG. 22, additional examples of other suitable shapes for actuator 180 and core clamp 200 are somewhat schematically illustrated. Specifically, actuator 180 and core clamp 200 may respectively include actuator engagement surfaces 210 and core clamp engagement surfaces 188 having saw-tooth, stepped, and/or ratcheting shapes. Furthermore, in implementations in which portion 312 translates but does not rotate as the threaded portion of the receiver is rotated, portion 312 may have other shapes, including asymmetrical shapes.

Figure 24:
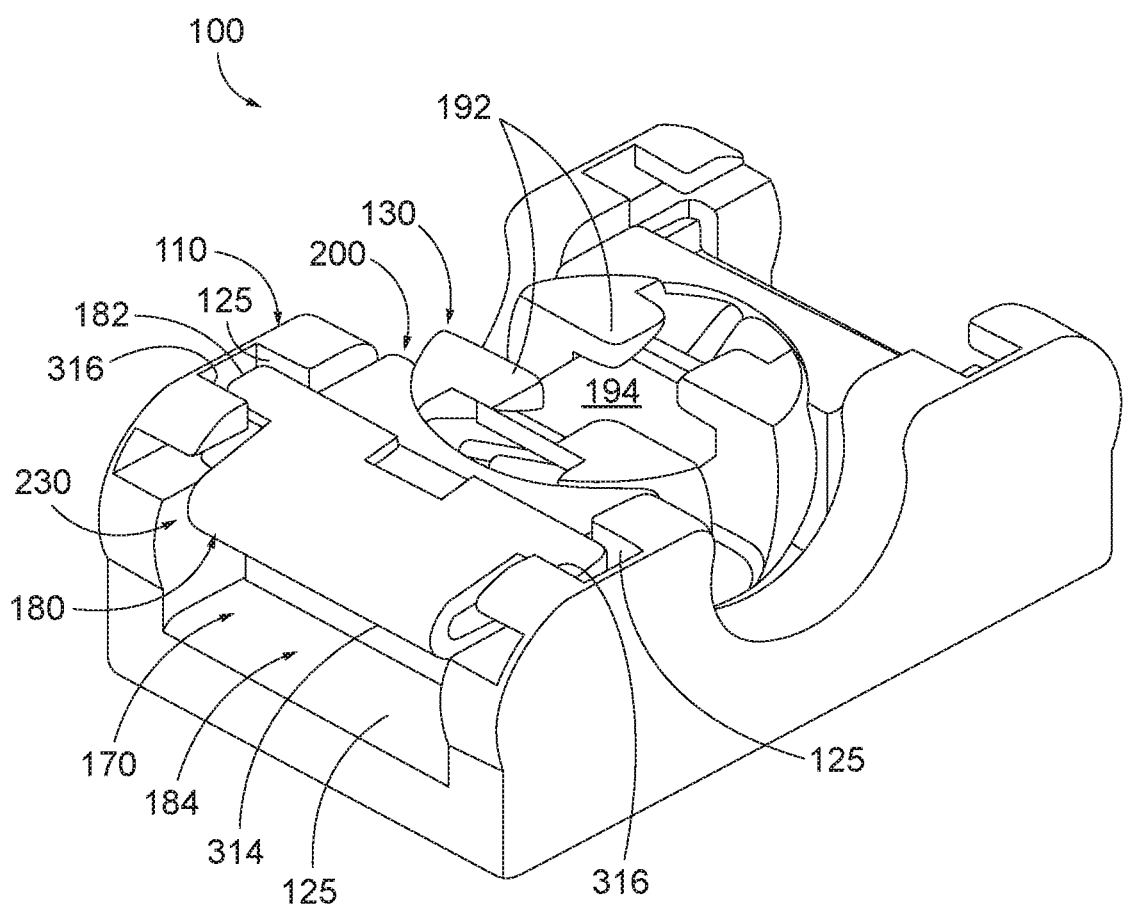
FIG. 24 is a top isometric view showing another example of an orthodontic bracket according to the present disclosure with a core positioning assembly in an engaged configuration.
Figure 25:
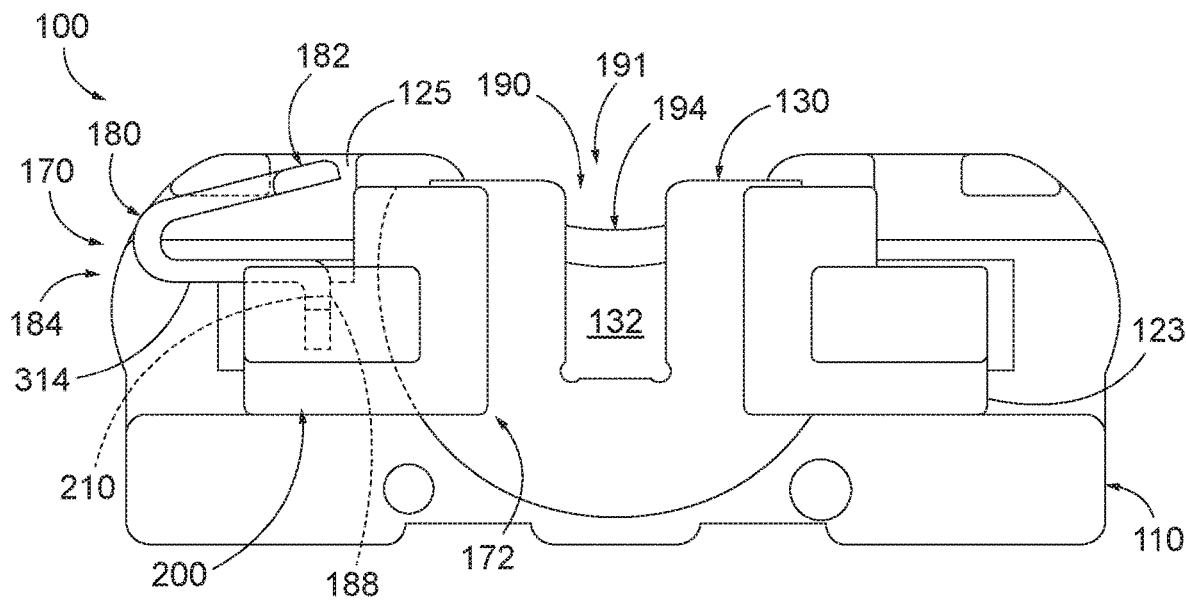
FIG. 25 is a partial cross-sectional side elevation schematic of the orthodontic bracket of FIG. 24 with the core positioning assembly in an engaged configuration.
Figure 26:
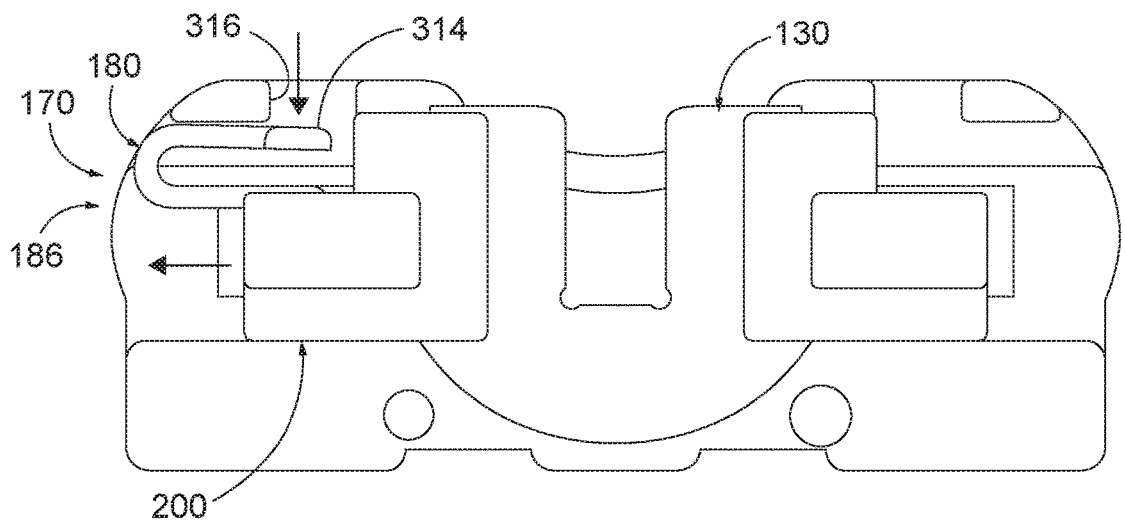
FIG. 26 is a partial cross-sectional side elevation schematic of the orthodontic bracket of FIG. 24 with the actuator in an unlocked position.

FIGS. 24-26 provide an additional example of a bracket 100 with a core positioning assembly 170. In FIGS. 24-26, actuator 180 is and/or includes a spring 314 that is selectively moved (namely, compressed) against its spring force to move the actuator from its locked position (shown in FIGS. 24-25) to its unlocked position (shown in FIG. 26). Thus, this example of actuator 180 also may be described as including an actuator biasing mechanism 230 that biases the actuator to its locked position. The actuator 180 of FIGS. 24-26 also provides an example of an actuator that is coupled to the core clamp such that sliding or other translational movement of the core clamp results in a corresponding sliding or other translational movement of the actuator. However, and as discussed, the actuator first must be pivoted (i.e., the spring must be compressed) to move the actuator to an unlocked position. As illustrated, the actuator of FIGS. 24-26 provide another example of an actuator in which the actuator receiver 182 extends into a passage 125 in the bracket body, at least when the actuator is in its locked position.

When bracket 100 is mounted on a patient's tooth, the bracket may be oriented in any suitable orientation relative to the patient's tooth, as is known in the art. For example, the bracket may be oriented so that the core engagement surface 204 of the core clamp faces in the occlusal direction, although it is within the scope of the disclosure that the core engagement surface may face in the gingival direction or transverse to the occlusal and gingival directions.

Bracket 100, including bracket body 110, core 130, and core positioning assembly 170 thereof, may be formed from any suitable material and/or materials. As examples, bracket body 110, core 130, core clamp 200, and actuator 180 may be formed from one or more of a metallic material, a stainless steel, a composite material, a glass, a ceramic, and/or a polymeric material.

Regardless of an exact conformation, shape, and/or construction of core positioning assembly 170, core positioning assemblies 170 according to the present disclosure may be adapted, configured, designed, and/or constructed to selectively retain core 130 at the selected prescriptive orientation within bracket body 110 despite variation in the manufacturing tolerances of bracket body 110, core 130, and/or core positioning assembly 170. As an example, core positioning assembly 170 may be configured to "take up" and/or otherwise account for the variation in the manufacturing tolerances. As a more specific example, sliding core positioning assembly 200 may be sized, shaped, and/or otherwise configured to selectively retain core 130 at the selected rotation orientation within bracket body 110 over a range of clearances therebetween.

As illustrated in dashed lines in FIG. 36, core 130 further may include and/or define a core tool-receiver 134. Core tool-receiver 134 may be configured, shaped, sized, and/or located to receive a core adjustment tool. The core adjustment tool may be configured to be inserted into and/or otherwise coupled to core tool-receiver 134 to enable alignment forces to be conveyed to the core via the tool to rotate, pivot, or otherwise move the core relative to bracket body 110 within the plurality of prescriptive orientations. Core tool-receiver 134 additionally or alternatively may be referred to as a tool receiver 134, a core receiver 134, a core recess 134, and/or a core socket 134.

As illustrated in dashed lines in FIG. 36, bracket 100 also may include a rotation-directing structure 150. Rotation-directing structure 150 may be configured to permit rotation of core 130 about a rotational axis (such as the A-axis, the B-axis, and/or the C-axis) and/or to limit rotation of core 130 about another rotational axis that may be different from a/the rotational axis about which rotation is permitted. The rotational axis may extend in one of a gingival-occlusal direction, in a mesial-distal direction, in a buccal-lingual direction, and/or in a labial-lingual direction, and the rotation-directing structure may restrict rotation about one or more other of these axial directions.

Rotation-directing structure 150 may include any suitable structure that may permit rotation of core 130 relative to bracket body 110 about the rotational axis (or about a selected rotational axis). Additionally or alternatively, rotation-directing structure 150 also may include any suitable structure that may resist, limit, restrict, and/or block rotation of core 130 relative to bracket body 110 about the other rotational axes.

As an example, rotation-directing structure 150 may include a groove 152 and a post 154 that is configured to translate within the groove. When rotation-directing structure 150 includes groove 152 and post 154, groove 152 and/or post 154 may be defined by and/or operatively attached to any suitable structure. As an example, one of groove 152 and post 154 may be defined by core 130, and the other of groove 152 and post 154 may be defined by bracket body 110 and/or by base 112. As another example, and as also discussed herein, core 130 may be defined by a plurality of core sections 136. Under these conditions, groove 152 may be defined by a first core section 136, and post 154 may be defined by a second core section 136. Groove 152 additionally or alternatively may be referred to as a channel 152, track 152, and/or guide 152. Post 154 additionally or alternatively may be referred to as a projection 154, rib 154, finger 154, and/or pin 154.

As another example, rotation-directing structure 150 may include a hole 156 and a stem 158 that is configured to rotate within the hole. When rotation-directing structure 150 includes hole 156 and stem 158, hole 156 and/or stem 158 may be defined by and/or operatively attached to any suitable structure. As an example, one of hole 156 and stem 158 may be defined by core 130, and the other of hole 156 and stem 158 may be defined by bracket body 110 and/or by base 112, when present. As another example, and when core 130 is defined by the plurality of core sections 136, hole 156 may be defined by the first core section 136 and stem 158 may be defined by the second core section 136.

As yet another example, rotation-directing structure 150 may include a rib 160. Rib 160 may project from one of core 130 and bracket body 110 and may be configured to press against a guiding surface 162 to direct, control, and/or regulate rotation of core 130 within bracket body 110.

As discussed, orthodontic bracket 100 includes rotation-directing structure 150 and core positioning assembly 170. It is within the scope of the present disclosure that bracket 100 may include a plurality of rotation-directing structures 150.

As an example, bracket 100 may include a first rotation-directing structure 150 that is configured to permit rotation of core 130 about a first rotational axis and/or to resist rotation of core 130 about one or more other rotational axes. In addition, bracket 100 also may include a second rotation-directing structure 150 that is configured to permit rotation of core 130 about a second rotational axis and/or to resist rotation of core 130 about one or more other rotational axes. The second rotational axis may be different from, or even perpendicular to, the first rotational axis.

As a more specific example, core 130 may include a plurality of core sections 136 that are secured together to collectively form core 130. For example, the plurality of core sections 136 may include at least a first core section 141 and a second core section 142. Under these conditions, first rotation-directing structure 150 may be configured to permit the first core section to rotate relative to bracket body 110 about the first rotational axis, and second rotation-directing structure 150 may be configured to permit the second core section to rotate relative to the first core section about the second rotational axis. The second rotation-directing structure may be at least partially defined by the first core section and by the second core section. Additional examples and more specific structures for rotation-directing structure 150 are disclosed in U.S. Pat. Nos. 9,655,694 and 9,999,481, which are incorporated by reference herein.

As illustrated in dashed lines in FIG. 36, and as discussed in connection with FIGS. 1-4, bracket 100 further may include a ligating structure 190, which may be configured to selectively retain archwire 95, when present, within archwire slot 132. Ligating structure 190 may be operatively affixed and/or attached to core 130, as illustrated in dashed lines in FIG. 36. As illustrated, the ligating structure obstructs the opening of archwire slot 132 and thereby restricts insertion or removal of the archwire through the opening when the ligating structure is in such an operative position. Additionally or alternatively, ligating structure 190 also may be operatively affixed and/or attached to bracket body 110, as illustrated in dash-dot lines.

Figure 32:
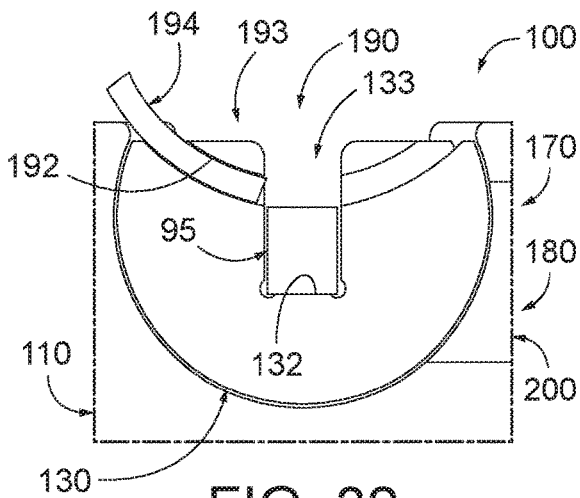
FIG. 32 is another fragmentary view of the orthodontic bracket of FIG. 31.

Ligating structure 190 may include and/or be any suitable structure that may be configured to retain archwire 95 within archwire slot 132. As an example, orthodontic bracket 100 may include and/or be a self-ligating orthodontic bracket 100. Under these conditions, ligating structure 190 may be a closure 194 and/or a gate 194 that forms a portion of orthodontic bracket 100. Gate 194 may be configured to transition between an open configuration 193 (as illustrated in FIG. 32), in which archwire 95 is not retained within archwire slot 132, and a closed configuration 191, in which archwire 95 is retained within the archwire slot. This may include transitioning and/or translating within a ligating structure receptacle 192 that may be defined by bracket 100 and/or by bracket body 110 and/or core 130 thereof. Expressed in slightly different terms, archwire slot 132 defines a longitudinal axis that is bounded on three sides by core 130, with gate 194 selectively bounding the archwire slot on a fourth side to form a closed perimeter in a direction transverse to the longitudinal axis when the gate is in the closed configuration. When the gate is in the open configuration, the archwire may be removed from the archwire slot, such as by moving the archwire out of the slot in a direction perpendicular to the longitudinal axis.

Additionally or alternatively, orthodontic bracket 100 may not be a self-ligating orthodontic bracket 100. Under these conditions, ligating structure 190 may include and/or be a ligature 196 that may be operatively affixed to orthodontic bracket 100, such as via one or more ligature-receiving structures 198, to secure the archwire within the archwire slot. Examples of ligature 196 include any suitable wire, band, and/or rubber (elastomeric) band. Examples of ligature-receiving structures 198 include, but are not limited to, tie wings, hooks, grooves, recesses, and/or projections. Ligatures 196 and/or ligature-receiving structures 198 also may be utilized with self-ligating brackets, including those disclosed, illustrated, and/or incorporated herein.

Regardless of the exact configuration, ligating structure 190 may include and/or be an active ligating structure or a passive ligating structure. When ligating structure 190 is a passive ligating structure, the ligating structure may not actively press against archwire 95, when present, as illustrated by the upper region of the archwire that is in dash-dot lines in FIG. 36. When ligating structure 190 is an active ligating structure, the ligating structure further may include an archwire biasing mechanism 199 that is configured to provide a compressive force to archwire 95, when present. Under these conditions, the ligating structure may contact and/or press against the archwire, as illustrated by the upper region of the archwire that is in dashed lines in FIG. 36.

When bracket 100 is self-ligating orthodontic bracket 100, ligating structure 190 further may define a ligating structure tool-receiving portion 195 that may be shaped to receive a tool. Ligating structure tool-receiving portion 195 may define any suitable shape, examples of which are discussed herein with reference to core tool-receiver 134.

When the tool is received within ligating structure tool-receiving portion 195, the tool may be translated to translate ligating structure 190, to translate ligating structure 190 within ligating structure receptacle 192, and/or to transition ligating structure 190 between the closed configuration and the open configuration. Additionally or alternatively, the tool also may be rotated to translate ligating structure 190, to translate ligating structure 190 within ligating structure receptacle 192, and/or to transition ligating structure 190 between the closed configuration and the open configuration.

Additional examples of ligating structures 190 that may be included in and/or utilized with bracket 100, such as the brackets illustrated in and/or described with respect to FIGS. 1-30 and 36 are illustrated in FIGS. 31-35. As illustrated in FIGS. 31-35, ligating structure 190 may include a ligating structure receptacle 192, which may be formed and/or defined within core 130 of bracket 100. As also illustrated, ligating structure receptacle 192 may be arcuate, or at least partially circular. Ligating structure receptacle 192 also may be referred to herein as a ligature-receiving channel. It is within the scope of the present disclosure that ligating structure receptacle 192 and the subsequently discussed gate optionally may have planar or linear configurations.

Figure 31:
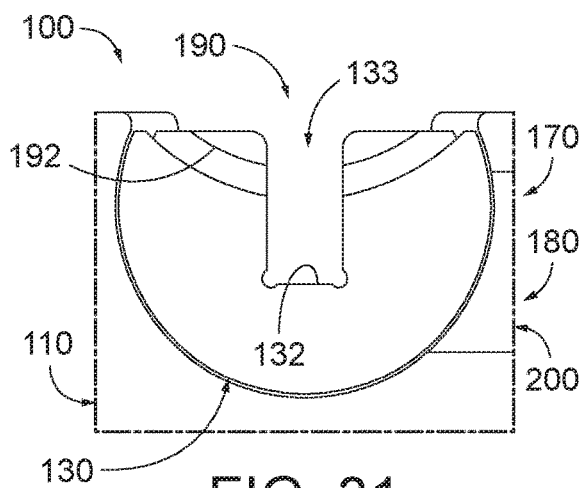
FIG. 31 is a fragmentary cross-sectional view of a portion of an orthodontic bracket with an example of a ligating structure that may be utilized with orthodontic brackets according to the present disclosure.

As illustrated in the transition from FIG. 31 to FIG. 32, a gate, a closure, and/or a ligature, 194 may be positioned within a portion of ligating structure receptacle 192 in an open configuration 193. When in the open configuration, the gate permits an archwire 95 to be positioned within or removed from an archwire slot 132 that is defined by the core, with the archwire being inserted or removed through an opening or inlet 133 of the archwire slot that extends along the length of the archwire slot. Stated another way, when the gate is in the open configuration, the gate permits access to the archwire slot, such as to permit the archwire to be positioned in, or removed from, the archwire slot.

Figure 33:
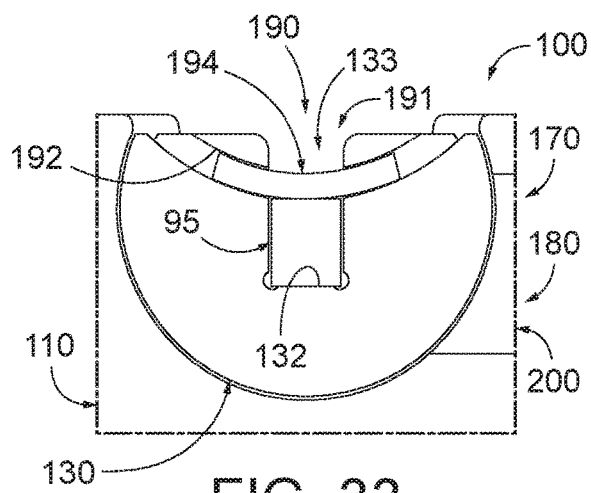
FIG. 33 is another fragmentary view of the orthodontic bracket of FIGS. 31-32.

As illustrated in the transition from FIG. 32 to FIG. 33, gate 194 may be transitioned from open configuration 193 to a closed configuration 191. This transition may be accomplished by sliding the gate into the arcuate core, sliding the gate along ligating structure receptacle 192, and/or inserting the gate into, or fully into, the ligating structure receptacle. When the gate is in the closed configuration, the gate retains the archwire within the archwire slot, prevents removal of the archwire from the archwire slot through opening 133, and/or resists relative motion of the archwire within the archwire slot.

Figure 34:
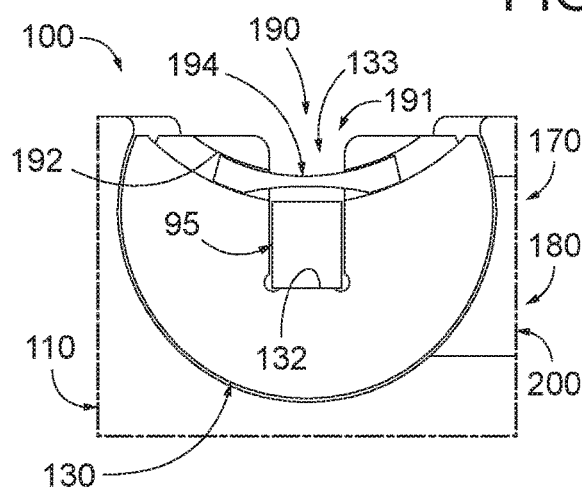
FIG. 34 is another fragmentary view of the orthodontic bracket of FIGS. 31-33.

Gate 194 may include any suitable structure that may be selectively transitioned between the open configuration and the closed configuration. As an example, gate 194 may include and/or be an active gate, which presses against archwire 95, as illustrated in FIG. 33. As another example, gate 194 may include and/or be a passive gate, which retains the archwire within the archwire slot but does not necessarily press against the archwire, as illustrated in FIG. 34. As yet another example, gate 194 may include and/or be a combination, or a combined active and passive, gate that includes both a passive region 274 and an active region 276, as illustrated in FIG. 35. Such a combination gate may be configured for both active and passive retention of the archwire depending upon a position of the gate within the ligating structure receptacle.

Returning to FIG. 36, and as illustrated in dashed lines, orthodontic brackets 100 according to the present disclosure further may include at least one core stabilizer 271, and optionally a plurality of core stabilizers 271. Core stabilizer 271, when present, may operatively engage both bracket body 110 and core 130, thereby resisting relative motion therebetween. Core stabilizer 271, when present, may engage both bracket body 110 and core 130 to resist relative motion therebetween at all times when the core positioning assembly is in the engaged configuration, and/or when the core positioning assembly is in the disengaged configuration. As an example, the core stabilizer may be operatively attached to and/or may extend from bracket body 110 and may press against core 130. As another example, the core stabilizer may be operatively attached to and/or may extend from core 130 and may press against bracket body 110. As yet another example, the core stabilizer may comprise a stabilizer material 272 that extends between, and operatively engages both bracket body 110 and core 130. Core stabilizer 271, when present, may have any suitable structure and/or may be formed from any suitable stabilizer material 272. As examples, the core stabilizer may include and/or be an elastomer, silicone, rubber, a spring, a spring-biased structure, and/or a resilient structure.

Core stabilizer 271, when present, may be configured to resist relative motion between bracket body 110 and core 130 but may permit relative motion between the bracket body and the core when greater than a threshold adjustment force is applied to the core. Thus, resisting relative motion does not mean that relative motion is not permitted; instead it is resisted or inhibited unless greater than the threshold adjustment force is applied to the core. Thus, when core stabilizer 271 is present, the core should not freely rotate or otherwise adjust under the influence of gravity when the core positioning assembly is in the disengaged configuration.

As an example, orthodontic bracket 100 may be retained at an initial relative orientation between the bracket body and the core, or at an initial prescription, by core positioning assembly 170, which may be in engaged configuration 172. Subsequently, an orthodontist may transition core positioning assembly 170 to disengaged configuration 174, thereby permitting adjustment of the prescription of the orthodontic bracket. Under these conditions, and while it may be desirable for the orthodontic bracket to permit adjustment of the prescription, it may be undesirable for the orthodontic bracket to quickly and/or spontaneously transition from the initial prescription to another prescription responsive to the core positioning assembly being transitioned to the disengaged configuration. As such, core stabilizer 271 may, or may be utilized to, retain the orthodontic bracket at, or near, the initial prescription until the orthodontist applies greater than the threshold adjustment force to core 130. The threshold adjustment force may be, or may be required to be, greater than a force that may be applied to the core by archwire 95 while the orthodontic bracket has the initial prescription.

As discussed, core positioning assembly 170 may be configured to frictionally retain core 130 at the selected prescriptive orientation relative to bracket body 110 and/or within core receptacle 116. With this in mind, and as illustrated in dashed lines in FIG. 1, bracket body 110 also may include one or more friction-enhancing regions 128, just as core 130 and core clamp 200 may include such regions. Friction-enhancing regions 128, when present, also may be referred to herein as retention force-enhancing regions 128, as retention-enhancing regions 128, and/or as interlocking regions 128. Friction-enhancing regions 128 may be configured to increase a frictional, an attachment, an engagement, and/or a relative motion-resisting force between bracket body 110 and core 130 and/or between actuator 180 and core clamp 200 when core positioning assembly 170 is in engaged configuration 172. Additionally or alternatively, friction-enhancing regions 128 also may be configured to assist core positioning assembly 170 in retaining core 130 at the selected prescriptive orientation when the core positioning assembly is in the disengaged configuration. Specifically, upon configuring of the core positioning assembly from the engaged configuration to a disengaged configuration, friction-enhancing regions may retain the core in the selected prescriptive orientation until alignment forces are applied to the core to move the core to another prescriptive orientation of the plurality of prescriptive orientations.

It is within the scope of the present disclosure that friction-enhancing regions 128, when present, may include any suitable structure and/or structures. As an example, the friction-enhancing regions may include, or be, a roughened, an isotropically roughened, an at least substantially isotropically roughened, and/or a randomly roughened region of bracket body 110, of core 130, of core clamp 200, of actuator 180, and/or of a spacer 123 that extends between the bracket body and the core. As another example, the friction-enhancing regions may include, or be, a high surface energy, a resilient, an elastomeric, and/or a compressible region of bracket body 110, of core 130, of core clamp 200, of actuator 180, and/or of spacer 123.

As yet another example, the friction-enhancing regions may include, or be, an isotropically roughened, a patterned, a stepped, a discretely roughened, a saw-toothed, and/or a cross-hatched region of bracket body 110, of core 130, of core clamp 200, of actuator 180, and/or of spacer 123. Additional examples of friction-enhancing regions 128 include any suitable roughened surface (or region), high-friction surface (or region), resilient material, surface, and/or region, stepped material, surface, and/or region, indented material, surface and/or region, and/or projecting material, surface, and/or region.

FIGS. 27-30 provide additional examples of friction-enhancing regions 128 that may be included in and/or utilized with any suitable orthodontic bracket, including orthodontic brackets 100 of FIGS. 1-26 and 31-36. FIGS. 27-30 illustrate friction-enhancing region 128 in the context of a core engagement surface 204 of core clamp 200 and contact surface 206 of core 130. However, it is within the scope of the present disclosure that the friction-enhancing regions 128 illustrated in FIGS. 27-30 may be utilized with any suitable components of core positioning assembly 170 and/or bracket 100, including actuator engagement surface 210 of core clamp 200 and clamp engagement surface 188 of actuator 180.

Figures 27, 28:
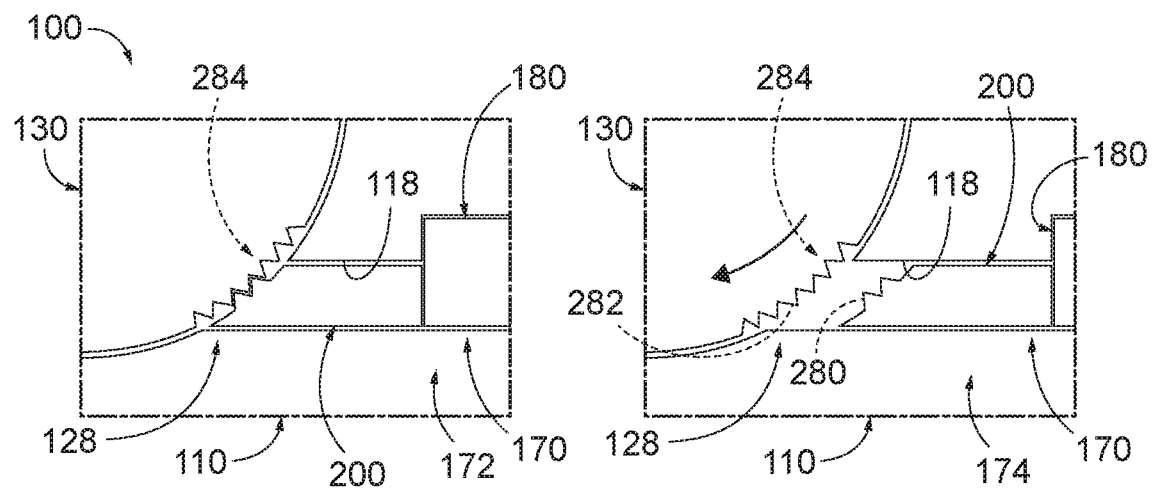
FIG. 27 is a fragmentary view of an orthodontic bracket with an example of a friction-enhancing region that may be utilized with orthodontic brackets according to the present disclosure.
FIG. 28 is another fragmentary view of an orthodontic bracket with an example of a friction-enhancing region that may be used with orthodontic brackets according to the present disclosure.
Figures 29, 30:
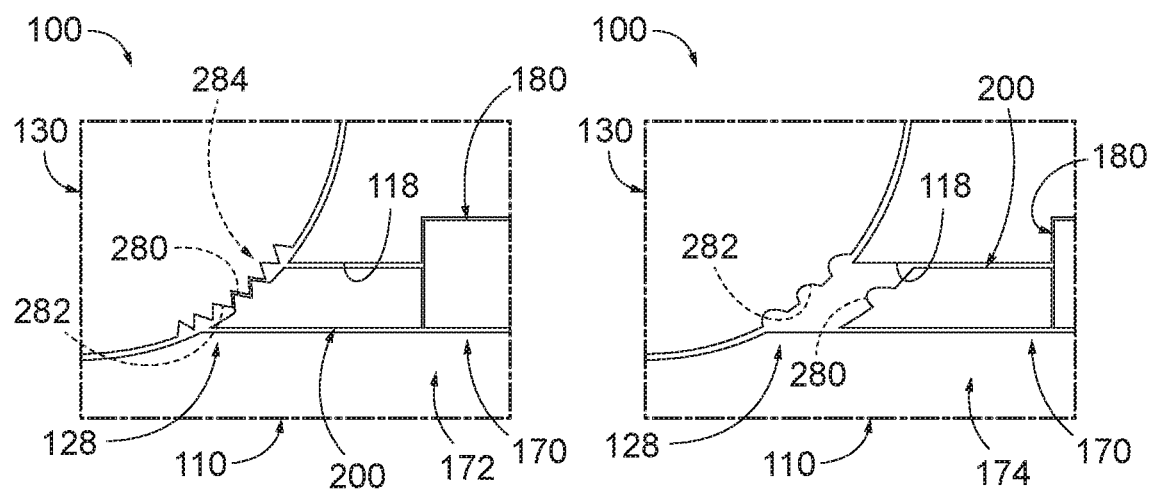
FIG. 29 is another fragmentary view of an orthodontic bracket with an example of a friction-enhancing region that may be used with orthodontic brackets according to the present disclosure.
FIG. 30 is another fragmentary view of an orthodontic bracket with an example of a friction-enhancing region that may be used with orthodontic brackets according to the present disclosure.

In the example of FIGS. 27-30, core clamp 200 is configured to translate, or slide, between an engaged configuration 172, as illustrated in FIGS. 27 and 29, and a disengaged configuration 174, as illustrated in FIGS. 28 and 30. As illustrated in FIGS. 28-29, friction-enhancing region 128 may include a saw-toothed region 284 that includes a plurality of projections 280 and a plurality of indentations 282. In the example of FIGS. 27-29, projections 280 are defined by core clamp 200, while indentations 282 are defined by core 130. However, this is not required, and it is within the scope of the present disclosure that the projections may be defined by the core and the indentations may be defined by another portion of core positioning assembly 170.

When in engaged configuration 172, and as illustrated in FIG. 27, at least one projection 280 may interlock with at least one indentation 282, thereby restricting relative motion between core 130 and core clamp 200. When in disengaged configuration 174, and as illustrated in FIG. 28, the at least one projection may be disengaged from the at least one indentation. Such a configuration may permit relative motion between the core and the core clamp (and/or the bracket body), such as is indicated by the arrow in FIG. 28. Subsequently, the core positioning assembly may be transitioned back to the engaged configuration, as illustrated in FIG. 29. In the example of FIGS. 27-29, the at least one projection 280 engages with a different indentation 282 in FIG. 27 when compared to FIG. 29. Thus, core positioning assembly 170 and/or friction-enhancing region 128 thereof operatively retains two different, or distinct, relative orientations between the bracket body and the core.

FIG. 30 illustrates that projections 280 and/or indentations 282 may have any suitable shape. As an example, and as illustrated in FIG. 30, the at least one projection 280 may be rounded and/or partially circular and indentations 282 also may be rounded and/or at least partially circular.

In the examples of FIGS. 27-30, friction-enhancing regions 128 are illustrated as permitting a plurality of discrete, or distinct, relative orientations between the core and the core clamp, such as which may correspond to distinct prescriptive orientations of the plurality of prescriptive orientations. However, this is not required, and it is within the scope of the present disclosure that friction-enhancing regions 128 may not define or assist in defining the plurality of prescriptive orientations of the core.

FIGS. 31-35 provide examples of an orthodontic bracket 100 including a ligating structure 190 that may be included with and/or utilized with any suitable orthodontic bracket, including any orthodontic bracket 100 illustrated in FIGS. 1-30 and 36 and/or discussed herein. As illustrated in FIGS. 31-35, ligating structure 190 may include a ligating structure receptacle 192, which may be formed and/or defined within core 130 of orthodontic bracket 100. As also illustrated, ligating structure receptacle 192 may be arcuate, or at least partially circular. Ligating structure receptacle 192 also may be referred to herein as a ligature-receiving channel. It is within the scope of the present disclosure that ligating structure receptacle 192 and the subsequently discussed gate optionally may have planar or linear configurations.

As illustrated in the transition from FIG. 31 to FIG. 32, a gate, a closure, and/or a ligature, 194 may be positioned within a portion of ligating structure receptacle 192 in an open configuration 193. When in the open configuration, the gate permits an archwire 95 to be positioned within or removed from an archwire slot 132 that is defined by the core, with the archwire being inserted or removed through an opening or inlet 133 of the archwire slot that extends along the length of the archwire slot. Stated another way, when the gate is in the open configuration, the gate permits access to the archwire slot, such as to permit the archwire to be positioned in, or removed from, the archwire slot.

As illustrated in the transition from FIG. 32 to FIG. 33, gate 194 may be transitioned from open configuration 193 to a closed configuration 191. This transition may be accomplished by sliding the gate into the core, sliding the gate along ligating structure receptacle 192, and/or inserting the gate into, or fully into, the ligating structure receptacle. When the gate is in the closed configuration, the gate retains the archwire within the archwire slot, prevents removal of the archwire from the archwire slot through opening 133, and/or resists relative motion of the archwire within the archwire slot.

Gate 194 may include any suitable structure that may be selectively transitioned between the open configuration and the closed configuration. As an example, gate 194 may include and/or be an active gate, which presses against archwire 95, as illustrated in FIG. 33. As another example, gate 194 may include and/or be a passive gate, which retains the archwire within the archwire slot but does not necessarily press against the archwire, as illustrated in FIG. 34. As yet another example, gate 194 may include and/or be a combination, or a combined active and passive, gate that includes both a passive region 274 and an active region 276, as illustrated in FIG. 35. Such a combination gate may be configured for both active and passive retention of the archwire depending upon a position of the gate within the ligating structure receptacle.

Additional examples of orthodontic brackets, bracket bodies, cores, archwire slots, accessories, rotation directing structures, friction-enhancing regions, constructions, ligatures, ligating structures, gates, methods of use, etc. are disclosed in U.S. Pat. Nos. 3,772,787, 4,197,642, 4,248,588, 4,443,189, 4,492,573, 4,698,017, 5,094,614, 5,466,151, 5,562,444, 5,586,882, 5,630,715, and 7,819,660, and U.S. Patent Application Publication Nos. 2011/0183280, 2012/0308952, and 2014/0272751, the complete disclosures of which are incorporated by reference.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, "selective" and "selectively," when modifying an action, movement, configuration, or other activity of one or more components or characteristics according to the present disclosure, means that the specified action, movement, configuration, or other activity is a direct or indirect result of user manipulation of an aspect of, or one or more components.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, "operative" and "operatively," when modifying an action, movement, configuration, interconnection, coupling, or other relationship of one or more components of a drink container according to the present disclosure, means that the specified action, movement, configuration, interconnection, coupling or other relationship is performed and/or achieved as a result of standard (i.e., intended) operation and/or functional utilization of the one or more components, such as in a manner described herein.

As used herein, the phrase, "for example," the phrase, "as an example," and/or simply the term "example," when used with reference to one or more components, features, details, structures, and/or embodiments according to the present disclosure, are intended to convey that the described component, feature, detail, structure, and/or embodiment is an example of components, features, details, structures, and/or embodiments according to the present disclosure. Thus, the described component, feature, detail, structure, and/or embodiment is not intended to be limiting, required, or exclusive/exhaustive; and other components, features, details, structures, and/or embodiments, including structurally and/or functionally similar and/or equivalent components, features, details, structures, and/or embodiments, are also within the scope of the present disclosure.

Examples of adjustable-prescription orthodontic brackets according to the present disclosure are presented in the following enumerated paragraphs.

A1. An orthodontic bracket, comprising:
a bracket body that defines a core receptacle and includes a bracket base that is configured to be mounted on a patient's tooth;
a core received and retained within the core receptacle, wherein the core defines an archwire slot sized to receive an archwire during orthodontic use of the orthodontic bracket, wherein the core is configured to be selectively positioned within the core receptacle to define a plurality of prescriptive orientations of the core relative to the bracket body; and
a core positioning assembly configured to selectively retain the core at a selected prescriptive orientation within the core receptacle, wherein the core positioning assembly is configured to be selectively transitioned between a disengaged configuration, in which the core positioning assembly permits movement of the core relative to the bracket body within the plurality of prescriptive orientations, and an engaged configuration, in which the core positioning assembly retains the core at the selected prescriptive orientation, and further wherein the core positioning assembly comprises a core clamp with a core engagement surface configured to selectively engage the core to retain the core at the selected prescriptive orientation.

A2. The bracket of paragraph A1, wherein the bracket further comprises an actuator selectively configured to secure the core clamp in engagement with the core to retain the core at the selected prescriptive orientation.

A2.1. The bracket of paragraph A2, wherein the actuator is configured to receive an external force to move the actuator relative to the core clamp and the core within a range of positions that include a locked position, in which the core clamp is secured by the actuator in engagement with the core and retains the core at the selected prescriptive orientation, and at least one unlocked position, in which the core positioning assembly permits movement of the core from the selected prescriptive orientation to a different prescriptive orientation of the plurality of prescriptive orientations.

A3. The bracket of paragraph A2, wherein the actuator includes a receiver configured to receive an external force to move the actuator relative to the core clamp and the core within a range of positions that include a locked position, in which the core clamp is secured by the actuator in engagement with the core and retains the core at the selected prescriptive orientation, and at least one unlocked position, in which the core positioning assembly permits movement of the core from the selected prescriptive orientation to a different prescriptive orientation of the plurality of prescriptive orientations.

A4. The bracket of paragraph A3, wherein the receiver defines at least one of a tool-receiving slot, a tool-receiving bore, a tool-receiving aperture, and a tool-receiving socket.

A5. The bracket of paragraph A3 or A4, wherein the bracket body defines a passage and further wherein the receiver extends at least partially through the passage.

A6. The bracket of any of paragraphs A2-A5, wherein the core clamp is configured for concurrent movement with the actuator.

A7. The bracket of any of paragraphs A2-A5, wherein the core clamp is configured for asynchronous movement with the actuator.

A8. The bracket of any of paragraphs A2-A7, wherein the core clamp is coupled to the actuator.

A9. The bracket of any of paragraphs A2-A7, wherein the actuator is configured to be selectively moved into and out of engagement with the core clamp.

A10. The bracket of any of paragraphs A2.1-A9, wherein when the actuator is in the locked position, the core clamp is restricted by the actuator from moving away from the core, and further wherein when the actuator moves from the locked position to an unlocked position, the actuator permits the core clamp to move away from the core.

A11. The bracket of any of paragraphs A2.1-A10, wherein when the actuator moves from the locked position to an unlocked position, the actuator moves the core clamp away from the core.

A12. The bracket of any of paragraphs A2.1-A10, wherein when the actuator moves from the locked position to an unlocked position, the core clamp is not positively drawn away from the core by the actuator.

A13. The bracket of any of paragraphs A2-A12, wherein the actuator does not engage the core in both the engaged configuration and the disengaged configuration of the core positioning assembly.

A14. The bracket of any of paragraphs A2-A13, wherein the core clamp separates the actuator from the core in both the engaged configuration and the disengaged configuration of the core positioning assembly.

A15. The bracket of any of paragraphs A1-A14 wherein in the engaged configuration of the core positioning assembly, the core engagement surface is sufficiently engaged with the core to retain the core at the selected prescriptive orientation A16. The bracket of any of paragraphs A1-A15, wherein in the disengaged configuration of the core positioning assembly, the core engagement surface is sufficiently disengaged with the core to permit movement of the core relative to the bracket body to a different selected prescriptive orientation of the plurality of prescriptive orientations.

A17. The bracket of any of paragraphs A2.1-A16, wherein the core clamp and the actuator are coupled to the bracket body in both the engaged configuration and the disengaged configuration.

A18. The bracket of any of paragraphs A1-A17, wherein when the core positioning assembly is in the engaged configuration, the core positioning assembly resists movement of the core from the selected prescriptive orientation at least until a threshold adjustment force is applied to the core via the archwire slot.

A19. The bracket of paragraph A18, wherein the threshold adjustment force is at least 0.06 pound-force (lbf), at least 0.07 lbf, at least 0.075 lbf, at least 0.08 lbf, at least 0.085 lbf, at least 0.09 lbf, at most 0.15 lbf, at most 0.14 lbf, at most 0.13 lbf, at most 0.12 lbf, at most 0.11 lbf, at most 0.1 lbf, at most 0.09 lbf, in the range of 0.06-0.12 lbf, in the range of 0.07-0.11 lbf, in the range of 0.073-0.09 lbf, and/or in the range of 0.075-0.085 lbf.

A20. The bracket of any of paragraphs A2.1-A19, wherein the core clamp is configured to selectively move relative to the bracket body into and out of engagement with the core, wherein the core clamp is in positive engagement with the core when the actuator is in the locked position, and further wherein when the actuator is in the unlocked position, the core clamp is at least one of spaced apart from the core and permitted by the actuator to move away from the core.

A21. The bracket of any of paragraphs A1-A20, wherein the core clamp is configured to at least one of translate, slide, and pivot relative to the bracket body.

A22. The bracket of any of paragraphs A1-A21, wherein the core clamp is configured to at least one of translate, slide, and pivot relative to the core.

A23. The bracket of any of paragraphs A2-A22, wherein the actuator is configured to at least one of translate, slide, pivot, rotate, and rotate about an eccentric axis relative to the bracket body.

A24. The bracket of any of paragraphs A2-A23, wherein the actuator is configured to at least one of translate, slide, pivot, rotate, and rotate about an eccentric axis relative to the core.

A25. The bracket of any of paragraphs A2-A24, wherein the actuator is configured to rotate relative to the bracket body, and further wherein responsive to rotational movement of the actuator relative to the bracket body, the core clamp is translated relative to the core.

A26. The bracket of any of paragraphs A2.1-A25, wherein the actuator is farther away from the core when the actuator is in the locked position than when the actuator is in the unlocked position.

A27. The bracket of any of paragraphs A2.1-A26, wherein the bracket body defines an actuator receptacle, and further wherein the actuator is at least partially received within the actuator receptacle.

A28. The bracket of paragraph A27, wherein the actuator receptacle is sized to permit selective movement of the actuator within the actuator receptacle as the core positioning assembly is moved between the engaged configuration and the disengaged configuration, and further wherein the actuator receptacle is configured to retain at least a portion of the actuator in the actuator receptacle when the core positioning assembly is in both the engaged configuration and the disengaged configuration.

A29. The bracket of any of paragraphs A1-A28, wherein the core is an arcuate core.

A30. The bracket of paragraph A29, wherein the core includes an arcuate clamp engagement surface that is positioned for selective engagement with the core clamp.

A31. The bracket of paragraph A30, wherein the arcuate clamp engagement surface is larger than the core engagement surface of the clamp.

A32. The bracket of any of paragraphs A1-A31, wherein the core has at least one of a hemispherical shape, an elliptical shape, an ovoid shape, a spheroid shape, and a spherical shape.

A33. The bracket of any of paragraphs A1-A32, wherein the core has a surface area, wherein the core engagement surface has a surface area, and further wherein the surface area of the core engagement surface is at least 5% of the surface area of the core.

A34. The bracket of paragraph A33, wherein the surface area of the core engagement surface is at least 10%, at least 15%, at least 20%, at least 25%, at least 30%, at least 35%, at most 50%, at most 40%, at most 35%, at most 30%, at most 25%, at most 20%, at most 15%, in the range of 5-50%, in the range of 10-40%, and/or in the range of 15-35% of the surface area of the core.

A35. The bracket of any of paragraphs A2-A34, wherein the core engagement surface of the actuator includes a concave core engagement surface.

A36. The bracket of paragraph A35, wherein a shape of the concave core engagement surface corresponds to a shape of a portion of the core that is engaged by the concave core engagement surface when the core positioning assembly is in the engaged configuration.

A37. The bracket of paragraph A35 or A36, wherein a radius of the concave core engagement surface corresponds to a radius of a portion of the core that is engaged by the concave core engagement surface when the core positioning assembly is in the engaged configuration.

A38. The bracket of any of paragraphs A2-A37, wherein the core engagement surface includes at least one of a convex core engagement surface, a planar core engagement surface, a conical core engagement surface, and a wedge-shaped core engagement surface.

A39. The bracket of any of paragraphs A2-A38, wherein at least one of the core engagement surface and the core includes a friction-enhancing region configured to increase a frictional force between the core engagement surface and the core when the core positioning assembly is in the engaged configuration.

A40. The bracket of paragraph A39, wherein the friction-enhancing region includes at least one of a roughened region, a plurality of teeth, a plurality of recesses, a resilient material, and a resilient gasket.

A41. The bracket of any of paragraphs A2-A40, wherein the core engagement surface is configured to frictionally retain the core at the selected prescriptive orientation when the core positioning assembly is in the engaged configuration.

A42. The bracket of any of paragraphs A2-A41, wherein the core engagement surface is configured to generate an interference fit with the core to retain the core at the selected prescriptive orientation when the core positioning assembly is in the engaged configuration.

A43. The bracket of any of paragraphs A2-A42, wherein the core clamp further includes an actuator engagement surface configured to be selectively engaged by the actuator to urge the core clamp against the core when the core positioning assembly is in the engaged configuration.

A44. The bracket of paragraph A43, wherein the actuator engagement surface is or includes at least one of a concave actuator engagement surface, a convex actuator engagement surface, a planar actuator engagement surface, a conical actuator engagement surface, a cylindrical actuator engagement surface, a wedge-shaped actuator engagement surface, a stepped actuator engagement surface, and a saw-toothed actuator engagement surface.

A44.1. The bracket of any of paragraphs A2-A44, wherein the actuator includes a core clamp engagement surface configured to selectively engage the actuator engagement surface to urge the core clamp against the core when the core positioning assembly is in the engaged configuration.

A45. The bracket of paragraph A44.1, wherein the core clamp engagement surface does not correspond to the shape of the actuator engagement surface.

A46. The bracket of paragraph A44.1, wherein the core clamp engagement surface corresponds to the shape of the actuator engagement surface.

A47. The bracket of any of paragraphs A44.1-A46, wherein the core clamp engagement surface is or includes at least one of a concave core clamp engagement surface, a convex core clamp engagement surface, a planar core clamp engagement surface, a conical core clamp engagement surface, a wedge-shaped core clamp engagement surface, a stepped core clamp engagement surface, a threaded core clamp engagement surface, a conical core clamp engagement surface, and a cylindrical core clamp engagement surface.

A48. The bracket of any of paragraphs A2-A47, wherein the actuator is a threaded actuator that is threadingly received within a threaded passage in the bracket body.

A49. The bracket of any of paragraphs A2-A48, wherein the actuator includes a cam.

A50. The bracket of any of paragraphs A2-A49, wherein the actuator includes a spring.

A51. The bracket of any of paragraphs A2-A50, wherein the core positioning assembly includes an actuator biasing mechanism configured to bias the core positioning assembly to the engaged configuration.

A52. The bracket of paragraph A51, wherein the actuator biasing mechanism includes a spring.

A53. The bracket of paragraph A51 or A52, wherein the actuator biasing mechanism includes a resilient member.

A54. The bracket of any of paragraphs A51-A53, wherein the actuator biasing mechanism is configured to bias the actuator toward the locked positon.

A55. The bracket of any of paragraphs A51-A54, wherein the actuator biasing mechanism is configured to bias the core clamp toward the core.

A56. The bracket of any of paragraphs A51-A55, wherein the actuator biasing mechanism is configured to bias the core clamp away from the core.

A57. The bracket of any of paragraphs A51-A56, wherein the actuator is configured for reciprocating movement relative to the bracket body, and further wherein the actuator biasing mechanism is configured to bias the actuator away from a sidewall of the bracket body.

A58. The bracket of any of paragraphs A1-A57, wherein the bracket body includes a bracket top, which is configured to be distal the bracket base and the tooth.

A59. The bracket of paragraph A58, wherein the bracket top includes a passage through which at least a portion of the core positioning assembly extends.

A60. The bracket of any of paragraphs A58-A59, wherein the core receptacle extends toward the bracket base from the bracket top.

A61. The bracket of any of paragraphs A1-A60, wherein the bracket body includes sidewalls that extend between the bracket base and a/the bracket top.

A62. The bracket of paragraph A61, wherein at least one of the sidewalls includes a passage through which at least a portion of the core positioning assembly extends.

A63. The bracket of any of paragraphs A1-A62, wherein the bracket further includes at least one spacer that extends between a bracket sidewall and the core and which engages the core at least when the core positioning assembly is in the engaged configuration.

B1. The bracket of any of paragraphs A1-A63, wherein the core positioning assembly includes a plurality of core clamps.

B2. The bracket of paragraph B2, wherein each of the plurality of core clamps has any of the features recited in any of paragraphs A1-A63.

B3. The bracket of any of paragraphs A2-A63 and B2, wherein the core positioning assembly includes a plurality of actuators.

B4. The bracket of paragraph B3, wherein the core clamp is a first core clamp, wherein the actuator is a first actuator, and further wherein the core positioning assembly further includes a second core clamp and a second actuator.

B5. The bracket of paragraph B4, wherein the second core clamp has any of the features recited in any of paragraphs A1-A63.

B6. The bracket of any of paragraphs B4-B5, wherein the second actuator has any of the features recited in any of paragraphs A2-A63.

C1. The bracket of any of paragraphs A1-A63 and B1-B6, wherein the core receptacle has a shape that corresponds to a shape of a portion of the core that contacts the bracket body.

C2. The bracket of paragraph C1, wherein the portion of the core defines a partial cylinder.

C3. The bracket of paragraph C1, wherein the portion of the core defines a partial sphere.

C4. The bracket of any of paragraphs A1-C3, wherein the bracket base is configured to be operatively affixed to a tooth.

C5. The bracket of paragraph C4, wherein a remainder of the bracket body is at least one of adhered, melted, welded, and brazed to the bracket base.

C6. The bracket of any of paragraphs A1-C5, wherein the bracket further includes a ligating structure that is operatively engaged with the core and configured to selectively retain an archwire within the archwire slot, optionally wherein the orthodontic bracket assembly is a self-ligating orthodontic bracket assembly.

C7. The bracket of paragraph C6, wherein the ligating structure defines a closed configuration, in which the ligating structure retains the archwire within the archwire slot, and an open configuration, in which the ligating structure does not retain the archwire within the archwire slot.

C8. The bracket of paragraph C7, wherein the bracket further includes a ligating structure receptacle that is configured to receive the ligating structure.

C9. The bracket of paragraph C8, wherein the ligating structure is configured to translate within the ligating structure receptacle to transition between the closed configuration and the open configuration.

C10. The bracket of any of paragraphs C6-C9, wherein the ligating structure is an active ligating structure, optionally wherein the active ligating structure includes an archwire biasing mechanism that is configured to provide a compressive force to the archwire.

C11. The bracket of any of paragraphs C6-C9, wherein the ligating structure is a passive ligating structure.

C12. The bracket of any of paragraphs A1-C11, wherein the bracket further includes a ligature-receiving structure configured to receive a ligature.

C12.1. The bracket of paragraph C12, wherein the ligature-receiving structure is a ligature-receiving channel shaped to receive the ligature.

C12.1.1. The bracket of paragraph C12.1, wherein the ligature-receiving channel is defined by the core.

C12.1.2. The bracket of any of paragraphs C12.1-C12.1.1, wherein the ligature-receiving channel is an arcuate ligature-receiving channel.

C12.1.3. The bracket of any of paragraphs C12.1-C12.1.2, wherein the bracket includes the ligature.

C12.1.4. The bracket of any of paragraphs C12.1-C12.1.3, wherein the ligature includes at least one of:

(i) an active ligature configured to operatively engage the archwire;

(ii) a passive ligature configured to retain the archwire within the archwire slot without operatively engaging the archwire; and (iii) a combined active and passive ligature configured to be transitioned between an active configuration, in which the ligature operatively engages the archwire, and a passive configuration, in which the ligature retains the archwire within the archwire slot without operatively engaging the archwire.

C13. The bracket of any of paragraphs A1-C12.1.4, wherein the bracket includes a rotation-directing structure configured to permit rotation of the core about a rotational axis and to limit rotation of the core about another axis that is different from the rotational axis.

C14. The bracket of paragraph C13, wherein the rotational axis extends at least substantially in one of a gingival-occlusal direction, a mesial-distal direction, a buccal-lingual direction, and a labial-lingual direction.

C15. The bracket of any of paragraphs C13-C14, wherein the rotation-directing structure includes a groove and a post that is configured to translate within the groove.

C16. The bracket of paragraph C15, wherein one of the groove and the post is defined by the core.

C17. The bracket of paragraph C16, wherein the other of the groove and the post is defined by one of the bracket body and the base.

C18. The bracket of any of paragraphs C13-C17, wherein the rotation-directing structure includes a hole and a stem that is configured to rotate within the hole.

C19. The bracket of paragraph C18, wherein one of the hole and the stem is defined by the core.

C20. The bracket of paragraph C19, wherein the other of the hole and the stem is defined by one of the bracket body and the base.

C21. The bracket of any of paragraphs C13-C20, wherein the rotation-directing structure includes a rib that projects from the core.

C22. The bracket of any of paragraphs C13-C21, wherein the rotation-directing structure is a first rotation-directing structure, wherein the rotational axis is a first rotational axis, and further wherein the bracket includes a second rotation-directing structure that is configured to permit rotation of the core about a second rotational axis.

C23. The bracket of paragraph C22, wherein the second rotational axis is different from the first rotational axis.

C24. The bracket of any of paragraphs C22-C23, wherein the second rotational axis is at least substantially perpendicular to the first rotational axis.

C25. The bracket of paragraph A24, wherein the core includes a first core section and a second core section, and further wherein the second rotation-directing structure is at least partially defined by the first core section and by the second core section.

C26. The bracket of paragraph C25, wherein the second rotation-directing structure is configured to permit rotation of the first core section relative to the second core section.

C27. The bracket of any of paragraphs A1-C26, wherein the core defines a core recess configured to receive a core adjustment tool that is configured to rotate the core to the selected prescriptive orientation.

C28. The bracket of any of paragraphs A1-C27, wherein the bracket body is a monolithic structure.

C29. The bracket of any of paragraphs A1-C28, wherein the bracket body includes a first bracket section and a second bracket section, wherein the first bracket section and the second bracket section are operatively affixed to one another, optionally wherein the first bracket section and the second bracket section together define the base, and further optionally wherein the first bracket section and the second bracket section are operatively affixed to a base section that defines the base.

C30. The bracket of any of paragraphs A1-C29, wherein at least one, and optionally both, of the core engagement surface and the core includes a friction-enhancing region configured to increase a frictional force between the core engagement surface and the core when the core positioning assembly is in the engaged configuration.

C31. The bracket of paragraph C31, wherein the friction-enhancing region includes at least one of a roughened region, a high-friction region, a resilient material, a projection, an indentation, and a saw-toothed region.

C32. The bracket of paragraph C31, wherein the friction-enhancing region includes, or instead is, a mechanical engagement region.

C33. The bracket of any of paragraphs A1-C32, wherein the bracket further includes a core stabilizer that operatively engages the bracket body and the core in both the engaged configuration and the disengaged configuration to resist relative movement between the bracket body and the core.

INDUSTRIAL APPLICABILITY

The orthodontic assemblies and methods disclosed herein are applicable to the dental and orthodontics industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, also are regarded as included within the subject matter of the inventions of the present disclosure.

The invention claimed is:

1. An orthodontic bracket, comprising:
a bracket body that defines a core receptacle and includes a bracket base that is configured to be mounted on a patient's tooth;
a core received and retained within the core receptacle, wherein the core defines an archwire slot sized to receive an archwire during orthodontic use of the orthodontic bracket, wherein the core is configured to be selectively positioned within the core receptacle to define a plurality of prescriptive orientations of the core relative to the bracket body; and
a core positioning assembly configured to selectively retain the core at a selected prescriptive orientation within the core receptacle, wherein the core positioning assembly is configured to be selectively transitioned between a disengaged configuration, in which the core positioning assembly permits movement of the core relative to the bracket body within the plurality of prescriptive orientations, and an engaged configuration, in which the core positioning assembly retains the core at the selected prescriptive orientation, and further wherein the core positioning assembly comprises:
a core clamp with a core engagement surface configured to selectively engage the core to retain the core at the selected prescriptive orientation, wherein the core clamp is configured to selectively move relative to both the core and the bracket body to selectively move the core engagement surface into engagement with the core; and
an actuator selectively configured to secure the core clamp in engagement with the core to retain the core at the selected prescriptive orientation, wherein the actuator is configured to selectively move relative to the core clamp, and further wherein the actuator includes a receiver configured to receive an external force to move the actuator relative to the core clamp and the core within a range of positions that include a locked position, in which the core clamp is secured by the actuator in engagement with the core and retains the core at the selected prescriptive orientation, and at least one unlocked position, in which the core positioning assembly permits movement of the core from the selected prescriptive orientation to a different prescriptive orientation of the plurality of prescriptive orientations.

2. The bracket of claim 1, wherein the actuator is configured to be selectively moved into and out of engagement with the core clamp, and further wherein the core clamp separates the actuator from the core in both the engaged configuration and the disengaged configuration of the core positioning assembly.

3. The bracket of claim 1, wherein when the actuator is in the locked position, the core clamp is restricted by the actuator from moving away from the core, and further wherein when the actuator moves from the locked position to an unlocked position, the actuator permits the core clamp to move away from the core.

4. The bracket of claim 1, wherein when the actuator moves from the locked position to an unlocked position, the actuator moves the core clamp away from the core.

5. The bracket of claim 1, wherein when the actuator moves from the locked position to an unlocked position, the core clamp is not positively drawn away from the core by the actuator.

6. The bracket of claim 1, wherein the core clamp and the actuator are coupled to the bracket body in both the engaged configuration and the disengaged configuration.

7. The bracket of claim 1, wherein when the core positioning assembly is in the engaged configuration, the core positioning assembly resists movement of the core from the selected prescriptive orientation at least until a threshold adjustment force is applied to the core via the archwire slot, and further wherein the threshold adjustment force is at least 0.06 pound-force (lbf).

8. The bracket of claim 1, wherein the core clamp is configured to translate relative to the bracket body and the actuator is configured to rotate relative to the bracket body as the core positioning assembly is moved from the disengaged configuration to the engaged configuration.

9. The bracket of claim 1, wherein the actuator is configured to rotate relative to the bracket body about an eccentric axis of the actuator.

10. The bracket of claim 1, wherein the bracket body includes sidewalls, and further wherein at least one of the sidewalls includes a passage through which a portion of the actuator extends.

11. The bracket of claim 10, wherein the actuator is a threaded actuator, wherein the passage is a threaded passage, and further wherein the actuator is threadingly received within the threaded passage at least when the core positioning assembly is in the engaged configuration.

12. The bracket of claim 1, wherein the actuator is configured to rotate relative to the bracket body, and further wherein responsive to rotational movement of the actuator relative to the bracket body, the core clamp is translated relative to the core.

13. The bracket of claim 1, wherein the core is an arcuate core, and the core engagement surface of the core clamp is an arcuate core engagement surface.

14. The bracket of claim 1, wherein the core has at least one of a hemispherical shape, an elliptical shape, an ovoid shape, a spheroid shape, and a spherical shape.

15. The bracket of claim 1, wherein the core has a surface area, wherein the core engagement surface of the core clamp has a surface area, and further wherein the surface area of the core engagement surface is at least 15% of the surface area of the core.

16. The bracket of claim 1, wherein the core clamp further includes an actuator engagement surface configured to be selectively engaged by the actuator to urge the core clamp against the core when the core positioning assembly is in the engaged configuration, and further wherein the actuator engagement surface is at least one of a concave actuator engagement surface, a planar actuator engagement surface, a stepped actuator engagement surface, and a saw-toothed actuator engagement surface.

17. The bracket of claim 1, wherein the actuator includes a core clamp engagement surface, and further wherein the core clamp engagement surface is at least one of a convex core clamp engagement surface, a planar core clamp engagement surface, a wedge-shaped core clamp engagement surface, and a stepped core clamp engagement surface.

18. The bracket of claim 1, wherein the actuator includes a core clamp engagement surface, and further wherein the core clamp engagement surface is a conical core clamp engagement surface.

19. The bracket of claim 1, wherein the actuator includes a cam.

20. The bracket of claim 1, wherein the actuator includes a spring.

21. The bracket of claim 1, wherein the receiver of the actuator defines at least one of a tool-receiving slot and a tool-receiving socket.

22. The bracket of claim 1, wherein the core positioning assembly includes an actuator biasing mechanism configured to bias the core positioning assembly to the engaged configuration.

* * * * *